US012569751B2

(12) United States Patent 　 (10) Patent No.: 　 US 12,569,751 B2
Jiang et al. 　 (45) Date of Patent: 　 Mar. 10, 2026

(54) SOMATOSENSORY INTERACTION METHOD AND ELECTRONIC DEVICE

(71) Applicant: Huawei Technologies Co., Ltd., Shenzhen (CN)

(72) Inventors: Yonghang Jiang, Grenoble (FR); Jie Zhao, Shenzhen (CN); Yu Sun, Shenzhen (CN); Xindi Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 18/253,317

(22) PCT Filed: Nov. 15, 2021

(86) PCT No.: PCT/CN2021/130670
§ 371 (c)(1),
(2) Date: May 17, 2023

(87) PCT Pub. No.: WO2022/105715
PCT Pub. Date: May 27, 2022

(65) Prior Publication Data
US 2024/0001220 A1 　 Jan. 4, 2024

(30) Foreign Application Priority Data
Nov. 18, 2020 　 (CN) ......................... 202011298677.X

(51) Int. Cl.
*A63F 13/212* 　 (2014.01)
*A63F 13/213* 　 (2014.01)
(Continued)

(52) U.S. Cl.
CPC .......... *A63F 13/212* (2014.09); *A63F 13/213* (2014.09); *A63F 13/428* (2014.09);
(Continued)

(58) Field of Classification Search
None
See application file for complete search history.

(56) References Cited

U.S. PATENT DOCUMENTS 10,360,806 B2 　 7/2019 　 Jang et al.
11,565,152 B2 * 　 1/2023 　 Liang ..................... G16H 20/30
(Continued)

FOREIGN PATENT DOCUMENTS

CN 　 101954171 A 　 1/2011
CN 　 102614661 A 　 8/2012
(Continued)

*Primary Examiner* — Seng H Lim
(74) *Attorney, Agent, or Firm* — Slater Matsil, LLP

(57) ABSTRACT

A somatosensory interaction method is provided. The electronic device may determine an exercise load of a somatosensory action of somatosensory interaction content based on a figure of a user. During somatosensory interaction, the electronic device may obtain a heart rate of the user to adjust the exercise load of the somatosensory action of the somatosensory interaction content. If an exercise capability indicated by the figure and the heart rate of the user is stronger, the exercise load of the somatosensory action of the somatosensory interaction content is higher. On the contrary, the exercise load of the somatosensory action of the somatosensory interaction content is lower.

18 Claims, 12 Drawing Sheets

(51) Int. Cl.

| | |
|---|---|
| *A63F 13/428* | (2014.01) |
| *A63F 13/537* | (2014.01) |
| *A63F 13/56* | (2014.01) |
| *A63F 13/58* | (2014.01) |
| *A63F 13/798* | (2014.01) |

(52) U.S. Cl.
CPC ............ *A63F 13/537* (2014.09); *A63F 13/56* (2014.09); *A63F 13/58* (2014.09); *A63F 13/798* (2014.09)

(56) References Cited

U.S. PATENT DOCUMENTS

| | | | | |
|---|---|---|---|---|
| 12,131,413 | B2 * | 10/2024 | Toth ........................ | A61B 5/748 |
| 12,189,854 | B2 * | 1/2025 | Ce Coleman .......... | G06N 3/126 |
| 2011/0311955 | A1 * | 12/2011 | Forsten .................... | G10H 1/40 |
| | | | | 434/247 |
| 2014/0113719 | A1 * | 4/2014 | Lee ........................ | A63F 13/212 |
| | | | | 463/31 |
| 2015/0335288 | A1 * | 11/2015 | Toth ........................ | A61B 5/388 |
| | | | | 600/391 |
| 2018/0107267 | A1 * | 4/2018 | Ma ........................... | G06F 3/011 |
| 2018/0204442 | A1 * | 7/2018 | Faaborg ................... | G08B 6/00 |
| 2019/0209777 | A1 * | 7/2019 | O'Connell ......... | A63B 24/0062 |
| 2020/0047055 | A1 * | 2/2020 | Ward ................... | G06V 10/143 |
| 2020/0254311 | A1 * | 8/2020 | Watterson ............ | A63B 22/025 |
| 2021/0197023 | A1 * | 7/2021 | Liang ................. | A63B 24/0087 |
| 2023/0147888 | A1 * | 5/2023 | Toth ...................... | G06T 11/206 |
| | | | | 345/440 |
| 2024/0042309 | A1 * | 2/2024 | Liu ........................ | A63F 13/428 |

FOREIGN PATENT DOCUMENTS

| | | | |
|---|---|---|---|
| CN | 103191562 | A | 7/2013 |
| CN | 103920286 | A | 7/2014 |
| CN | 107569853 | A | 1/2018 |
| CN | 107731303 | A | 2/2018 |
| CN | 110584627 | A | 12/2019 |
| KR | 20180015995 | A | 2/2018 |

* cited by examiner

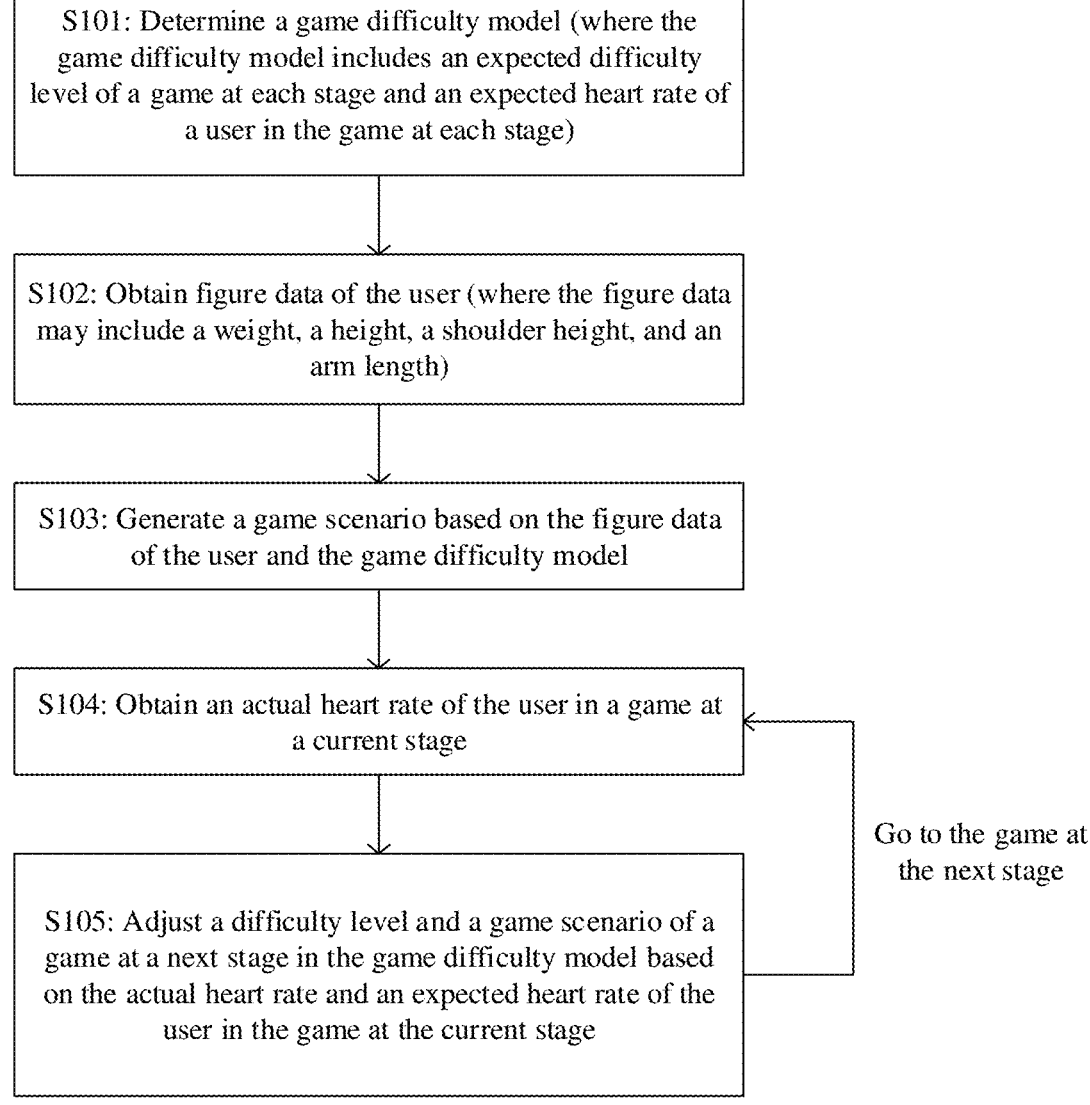

S101: Determine a game difficulty model (where the game difficulty model includes an expected difficulty level of a game at each stage and an expected heart rate of a user in the game at each stage)

S102: Obtain figure data of the user (where the figure data may include a weight, a height, a shoulder height, and an arm length)

S103: Generate a game scenario based on the figure data of the user and the game difficulty model S104: Obtain an actual heart rate of the user in a game at a current stage S105: Adjust a difficulty level and a game scenario of a game at a next stage in the game difficulty model based on the actual heart rate and an expected heart rate of the user in the game at the current stage Go to the game at the next stage

FIG. 3

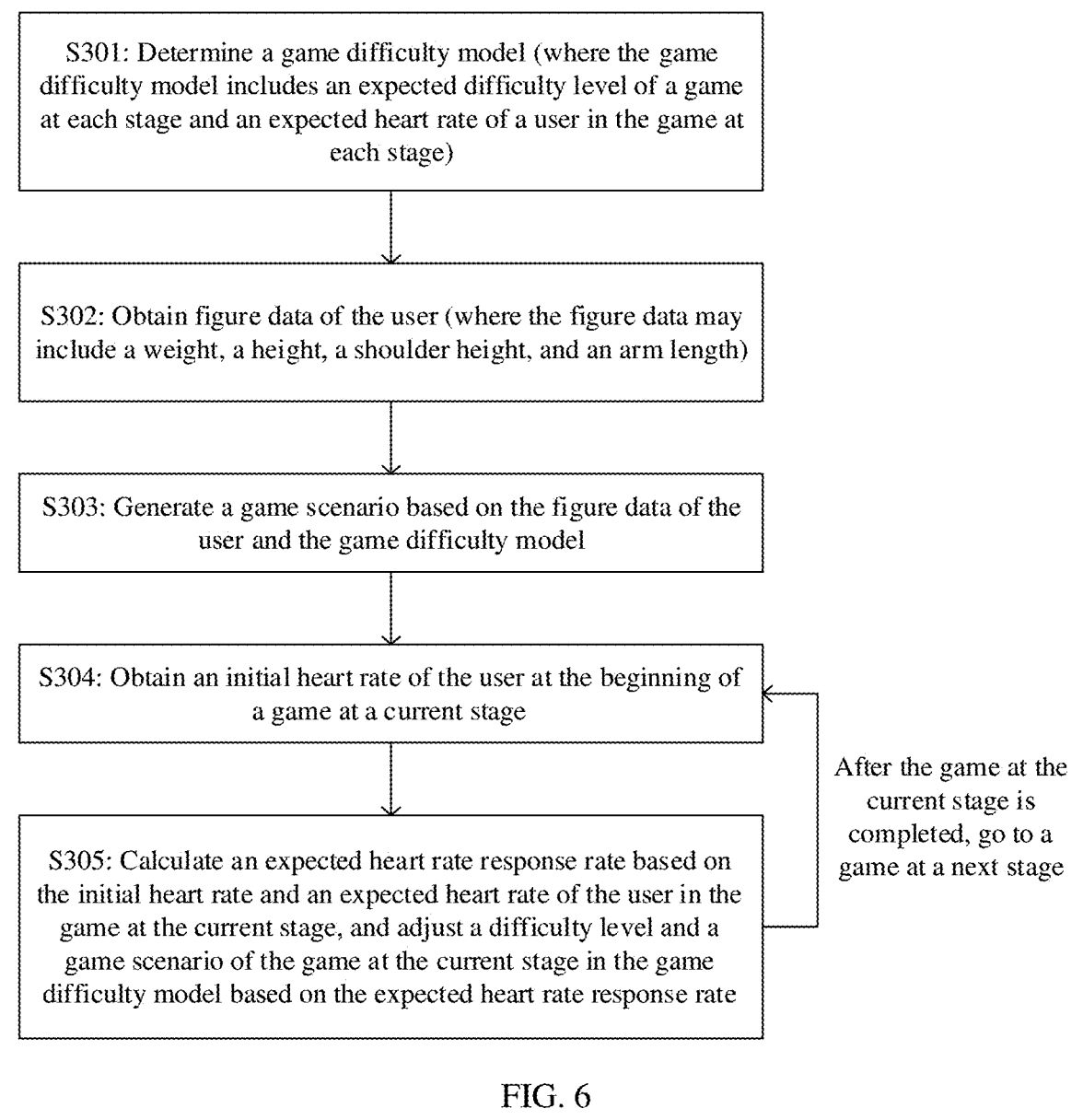

S301: Determine a game difficulty model (where the game difficulty model includes an expected difficulty level of a game at each stage and an expected heart rate of a user in the game at each stage)

S302: Obtain figure data of the user (where the figure data may include a weight, a height, a shoulder height, and an arm length)

S303: Generate a game scenario based on the figure data of the user and the game difficulty model S304: Obtain an initial heart rate of the user at the beginning of a game at a current stage After the game at the current stage is completed, go to a game at a next stage S305: Calculate an expected heart rate response rate based on the initial heart rate and an expected heart rate of the user in the game at the current stage, and adjust a difficulty level and a game scenario of the game at the current stage in the game difficulty model based on the expected heart rate response rate

FIG. 6

SOMATOSENSORY INTERACTION METHOD AND ELECTRONIC DEVICE

CROSS-REFERENCE TO RELATED APPLICATIONS

This application is a National Stage of International Patent Application No. PCT/CN2021/130670, filed on Nov. 15, 2021, which claims priority to Chinese Patent Application No. 202011298677.X, filed on Nov. 18, 2020, both of which are hereby incorporated by reference in their entireties.

TECHNICAL FIELD

This application relates to the field of internet of things technologies, and in particular, to a somatosensory interaction method and an electronic device.

BACKGROUND

With the improvement of people's awareness of fitness and exercises, somatosensory fitness games that integrate fitness and entertainment are loved by more people. The somatosensory fitness games improve interests of exercises, and people can conveniently achieve the purpose of the exercises in a game process.

At present, game difficulty and a somatosensory action that a user is indicated to perform in a somatosensory fitness game are usually fixed. An electronic device may play games of corresponding difficulty in a preset order, or play a game of corresponding difficulty based on a selection of a user. However, because exercise capabilities of different users are different, it is difficult for the foregoing somatosensory fitness game to help different users achieve exercise effects based on exercise capabilities of different users, and it is difficult to avoid exercise risks generated by playing excessively difficult games by users.

SUMMARY

This application provides a somatosensory interaction method and an electronic device. In this application, an exercise load of a somatosensory action of somatosensory interaction content may be adjusted based on a figure and a real-time heart rate of a user, so that the exercise load of the somatosensory action of the somatosensory interaction content matches an exercise capability of the user. This helps different users achieve expected exercise effects, and avoids exercise risks generated by doing excessively difficult exercises by the users.

According to a first aspect, an embodiment of this application provides a somatosensory interaction method. The method includes: An electronic device may obtain user data. The electronic device may display first somatosensory interaction content. An exercise load of a somatosensory action of the first somatosensory interaction content may be determined based on the user data. The user data may be used to predict physical fitness of a user. Better predicted physical fitness indicates a higher exercise load of the somatosensory action of the first somatosensory interaction content. The electronic device may detect that the user is performing a first action of the first somatosensory interaction content. The electronic device may obtain first heart data generated when the user performs the first action. The electronic device compares the first heart data with first expected heart data associated with the first somatosensory interaction content. Further, the electronic device displays second somatosensory interaction content. The second somatosensory interaction content may be content displayed by the electronic device at a next stage of the first somatosensory interaction content. If a comparison result of the electronic device indicates that the first heart data is different from first expected heart data, an exercise load of a somatosensory action of the second somatosensory interaction content is different from an exercise load of a somatosensory action of third somatosensory interaction content. The third somatosensory interaction content is interaction content that is preset to be displayed on a premise that the first heart data generated when the user performs the first action is the same as the first expected heart data.

Both the first heart data and the first expected heart data may be heart rates or heart rate percentages.

In this application, one somatosensory fitness game may include a plurality of game stages, and a game at each stage may include one or more game scenarios. Each game scenario may be presented through somatosensory interaction content displayed on a screen of the electronic device. The game scenario can be set based on different games. The games at the stages may have a same difficulty level or different difficulty levels. A difficulty level of a game at one stage may be determined by an exercise load of a somatosensory action of somatosensory interaction content at this stage. A game of a higher difficulty level indicates a higher requirement on an exercise capability of the user. Games of different difficulty levels can help users achieve different exercise effects.

In some embodiments, the exercise load may include one or more of the following: an amplitude of a somatosensory action, a quantity of times of completing the same somatosensory action within a same time length, and a type of the somatosensory action.

The amplitude of the somatosensory action may be expected overall displacement of a body of the user or a sum of expected displacement of all body pails of the user expected when the user performs the somatosensory action. The type of the somatosensory action may be divided based on difficulty of the somatosensory action. Various types of somatosensory actions may correspond to difficulty coefficients. A somatosensory action with a higher difficulty coefficient is more difficult, and indicates a higher exercise load.

The electronic device may increase the exercise load of the somatosensory action of the somatosensory interaction content by using one or more of the following methods: increasing the amplitude of the somatosensory action, increasing the quantity of times of completing the same somatosensory action within the same time length, adding a somatosensory action with a higher difficulty coefficient, and replacing a somatosensory action with a low difficulty coefficient with a somatosensory action with a higher difficulty coefficient.

The electronic device may decrease the exercise load of the somatosensory action of the somatosensory interaction content by using one or more of the following methods: decreasing the amplitude of the somatosensory action, decreasing the quantity of times of completing the same somatosensory action within the same time length, removing a somatosensory action with a higher difficulty coefficient, and replacing a somatosensory action with a high difficulty coefficient with a somatosensory action with a lower difficulty coefficient.

With reference to the first aspect, in some embodiments, the user data may include one or more of the following: a height, a weight, a shoulder height, and an arm length.

In a possible implementation, the electronic device may determine the exercise load of the somatosensory action of the first somatosensory interaction content based on a sum of the shoulder height and the arm length of the user. Specifically, the electronic device may predict that a higher sum of the shoulder height and the arm length of the user indicates better physical fitness of the user. Further, the electronic device may increase the exercise load of the somatosensory action of the first somatosensory interaction content.

In a possible implementation, the electronic device may determine the exercise load of the somatosensory action of the first somatosensory interaction content based on the weight of the user. Specifically, the electronic device may predict that a heavier weight of the user indicates poorer physical fitness of the user. Further, the electronic device may decrease the exercise load of the somatosensory action of the first somatosensory interaction content.

In a possible implementation, the electronic device may calculate a fatness index of the user based on the height and the weight of the user. Specifically, the electronic device may predict that a higher fatness index of the user indicates poorer physical fitness of the user. Further, the electronic device may decrease the exercise load of the somatosensory action of the first somatosensory interaction content.

The electronic device may further predict the physical fitness of the user with reference to another type of user data, for example, a body fat percentage and oxygen consumption per unit time of the user.

With reference to the first aspect, in some embodiments, if the comparison result of the electronic device indicates that the first heart data is the same as the first expected heart data, the second somatosensory interaction content is the same as the third somatosensory interaction content.

With reference to the first aspect, the first expected heart data may be a range that includes a plurality of values of the heart data. That the first heart data is different from the first expected heart data may specifically represent that the first heart data exceeds the range of the first expected heart data.

With reference to the first aspect, in some embodiments, if the first heart data is lower than the first expected heart data, the exercise load of the somatosensory action of the second somatosensory interaction content is higher than the exercise load of the somatosensory action of third somatosensory interaction content.

Specifically, in a possible implementation, a difficulty level of a game at each stage may be obtained through calculating based on pixel displacement of a related game item that is in the somatosensory interaction content and that is displayed on the screen. The pixel displacement of the related game item may indicate an exercise amplitude of completing a corresponding somatosensory action by the user. Change frequency of the related game item on the screen may indicate a quantity of times of completing the somatosensory action by the user in a period of time. A change direction and a type of the related game item on the screen may indicate a type of a somatosensory action to be completed by the user.

On a premise that the first heart data is the same as the first expected heart data, a preset difficulty level of a game at a next stage of the first somatosensory interaction content is a first difficulty level. When an exercise load of a somatosensory action of somatosensory interaction content of the game at the next stage is to be increased, the electronic device may increase the preset difficulty level of the game at the next stage on the basis of the first difficulty level. For example, the electronic device may increase the difficulty level on the basis of the first difficulty level based on a preset value. Alternatively, the electronic device may further determine an increase value of the difficulty level based on a difference between the first heart data and the first expected heart data. A larger difference between the first heart data and the first expected heart data indicates a larger increase value of the difficulty level.

Further, the electronic device may calculate, based on the determined difficulty level of the game at the next stage of the first somatosensory interaction content, pixel coordinates of the related game item that are in the interaction content of the game at this stage and that are displayed on the screen. The electronic device may determine an optimal combination of the pixel displacement of the related game item on the screen by using a dynamic programming algorithm (for example, a Viterbi algorithm or a greedy algorithm). The electronic device may display the somatosensory interaction content (namely, the second somatosensory interaction content) of the game at the next stage of the first somatosensory interaction content based on the obtained pixel coordinates of the related game item. Compared with the somatosensory action of the third somatosensory interaction content, the somatosensory action of the second somatosensory interaction content may have one or more of the following differences: An amplitude of the somatosensory action increases, a quantity of times of completing the same somatosensory action within the same time length increases, a somatosensory action with a higher difficulty coefficient is added, and a somatosensory action with a lower difficulty coefficient is replaced with a somatosensory action with a higher difficulty coefficient.

With reference to the first aspect, in some embodiments, if the first heart data is higher than the first expected heart data, the exercise load of the somatosensory action of the second somatosensory interaction content is lower than the exercise load of the somatosensory action of third somatosensory interaction content.

It may be learned from the foregoing embodiment that the electronic device may adaptively adjust a difficulty level of a game and an exercise load based on an exercise capability of the user in a game process, to guide the user to adjust exercise intensity. In this way, a somatosensory fitness game can help the user better achieve expected exercise effects, and can avoid an exercise risk caused by performing an excessively difficult exercise by the user.

With reference to the first aspect, in some embodiments, the first heart data is obtained by the electronic device from another heart data detection device. A communication connection is established between the electronic device and the heart data detection device. Alternatively, the first heart data is obtained by the electronic device through calculation. For example, the electronic device may collect a face image of the user in the exercise process by using a camera, and calculate heart data of the user according to a non-contact heart rate detection method.

With reference to the first aspect, in some embodiments, if the electronic device determines that the first heart data is greater than or equal to a maximum value of the heart data of the user, the electronic device may pause the first somatosensory interaction content. Alternatively, the electronic device may display fourth somatosensory interaction content. An exercise load of a somatosensory action of the fourth somatosensory interaction content is lower than the exercise load of the somatosensory action of the first somatosensory interaction content.

It may be learned from the foregoing embodiment that, when the electronic device determines that the heart rate (or a heart rate percentage) of the user reaches or even exceeds a maximum heart rate (or a maximum heart rate percentage) of the user, the electronic device may immediately stop the game or decrease the exercise load of the somatosensory action of the interaction content at the next stage, to avoid an exercise risk of the user.

With reference to the first aspect, in some embodiments, the electronic device may detect information about a site in which the user is located. The information about the site may include coordinates of a position at which an obstacle exists in the site in which the user is located, and the obstacle may be an object whose distance from the user falls within a first preset distance range. A value of the first preset distance is not limited in this embodiment of this application. The electronic device may change the first somatosensory interaction content and the second somatosensory interaction content based on the information about the site. A somatosensory action of changed first somatosensory interaction content and a somatosensory action of changed second somatosensory interaction content are performed in directions of avoiding the obstacle.

It may be learned from the foregoing embodiment that, the electronic device may detect, in the game process, the site information about the site in which the user is located, and dynamically adjust the somatosensory interaction content based on a situation of the obstacle near the user when the user exercises, to avoid injury caused by a collision between the user and the obstacle.

According to a second aspect, an embodiment of this application provides another somatosensory interaction method. The method includes: An electronic device obtains user data. The electronic device displays first somatosensory interaction content. An exercise load of a somatosensory action of the first somatosensory interaction content is determined based on the user data. The user data is used to predict physical fitness of a user. Better predicted physical fitness indicates a higher exercise load of the somatosensory action of the first somatosensory interaction content. The electronic device obtains second heart data of the user. The second heart data is heart data of the user that is generated before the end of the somatosensory action of the first somatosensory interaction content. The electronic device calculates a first heart rate response rate based on the second heart data and first expected heart data that is associated with the first somatosensory interaction content. The first heart rate response rate indicates an expected change rate of heart data in a process in which the user performs the somatosensory action of the first somatosensory interaction content. The electronic device changes the exercise load of the somatosensory action of the first somatosensory interaction content based on the second heart data and the first heart rate response rate, and displays first somatosensory interaction content whose exercise load is changed. If the second heart data is unchanged and the first heart rate response rate is higher, or if the first heart rate response rate is unchanged and the second heart data is larger, a changed exercise load of a somatosensory action of the first somatosensory interaction content is higher.

The user data may include one or more of the following: a height, a weight, a shoulder height, and an arm length.

Both the second heart data and the first expected heart data may be heart rates or heart rate percentages.

It may be learned from the somatosensory interaction method that, the electronic device may calculate an expected heart rate response rate based on an initial heart rate and an expected heart rate of the user in a game at a specific stage, and adjust a difficulty level and a game scenario of the game at this stage based on the expected heart rate response rate. After completing a somatosensory action indicated in an adjusted game scenario, a heart rate (or a heart rate percentage) reached by the user may be better close to the expected heart rate (or an expected heart rate percentage) of the user in the game at this stage. In this way, the user can better achieve an expected exercise effect of the game at this stage.

With reference to the second aspect, in some embodiments, the second heart data may be heart data of the user that is generated at any time before the end of the first somatosensory interaction content. Preferably, the second heart data may be heart data of the user that is generated in a first time period after the electronic device starts to display the first somatosensory interaction content. The first time period may be a short time period, for example, 1 second or 2 seconds. A length of the first time period is not limited in this embodiment of this application. Alternatively, the second heart data may be heart data of the user that is generated in a second time period before the electronic device starts to display the first somatosensory interaction content. The second time period may be a short time period, for example, 1 second or 2 seconds. A length of the second time period is not limited in this embodiment of this application.

With reference to the second aspect, in some embodiments, that the electronic device calculates a first heart rate response rate based on the second heart data and first expected heart data may be specifically: The electronic device calculates a difference between the second heart data and the first expected heart data, and divides the difference by a time length of a process from a time at which the second heart data is obtained to the end of the first somatosensory interaction content, to obtain the first heart rate response rate.

With reference to the second aspect, in some embodiments, the exercise load of the somatosensory action may include one or more of the following: an amplitude of the somatosensory action, a quantity of times of completing the same somatosensory action within a same time length, and a type of the somatosensory action.

The amplitude of the somatosensory action may be expected overall displacement of a body of the user or a sum of expected displacement of all body parts of the user.

With reference to the second aspect, in some embodiments, the second heart data may be obtained by the electronic device from another heart data detection device, and a communication connection is established between the electronic device and the heart data detection device. Alternatively, the second heart data is obtained by the electronic device through calculation.

With reference to the second aspect, in some embodiments, if the electronic device determines that the second heart data is greater than or equal to a maximum value of the heart data of the user, the electronic device pauses the first somatosensory interaction content. Alternatively, the electronic device displays fourth somatosensory interaction content. An exercise load of a somatosensory action of the fourth somatosensory interaction content is lower than the exercise load of the somatosensory action of the first somatosensory interaction content.

With reference to the second aspect, in some embodiments, the electronic device detects information about a site in which the user is located. The information about the site includes coordinates of a position at which an obstacle exists in the site in which the user is located, and the obstacle is an object whose distance from the user falls within a first preset distance range. The electronic device changes the first somatosensory interaction content based on the information about the site. A somatosensory action of changed first somatosensory interaction is performed in a direction of avoiding the obstacle.

According to a third aspect, an embodiment of this application provides an electronic device. The electronic device includes a display, a processor, a memory, a heart data detection apparatus, and a somatosensory action collection apparatus. The display may be configured to display somatosensory interaction content. The heart data detection apparatus may be configured to detect heart data of a user. The somatosensory action collection apparatus may be configured to detect a somatosensory action of the somatosensory interaction content that is performed by the user. The memory may be configured to store a computer program. The processor may be configured to invoke the computer program, so that the electronic device performs any possible implementation of the first aspect and the second aspect.

With reference to the third aspect, in some embodiments, the heart data detection apparatus may include a camera. The camera and the electronic device may be of an integrated structure. Alternatively, the camera may be externally connected to the electronic device. An image (for example, a face image) collected by the foregoing camera may be used for heart rate detection.

According to a fourth aspect, an embodiment of this application provides a chip. The chip is applied to an electronic device. The chip includes one or more processors. The processor is configured to invoke computer instructions, so that the electronic device performs any possible implementation of the first aspect and the second aspect.

According to a fifth aspect, an embodiment of this application provides a computer program product including instructions. When the computer program product runs on a device, the electronic device is enabled to perform any possible implementation of the first aspect and the second aspect.

According to a sixth aspect, an embodiment of this application provides a computer-readable storage medium including instructions. When the instructions are run on an electronic device, the electronic device is enabled to perform any possible implementation of the first aspect and the second aspect.

It may be understood that the electronic device provided in the third aspect, the chip provided in the fourth aspect, the computer program product provided in the fifth aspect, and the computer-readable storage medium provided in the sixth aspect are all configured to perform the method provided in embodiments of this application. Therefore, for beneficial effects that can be achieved, refer to beneficial effects in corresponding methods. Details are not described herein again.

BRIEF DESCRIPTION OF DRAWINGS

FIG. 3 is a flowchart of a somatosensory interaction method according to an embodiment of this application;

FIG. 6 is a flowchart of another somatosensory interaction method according to an embodiment of this application;

DESCRIPTION OF EMBODIMENTS

Figure 1A:
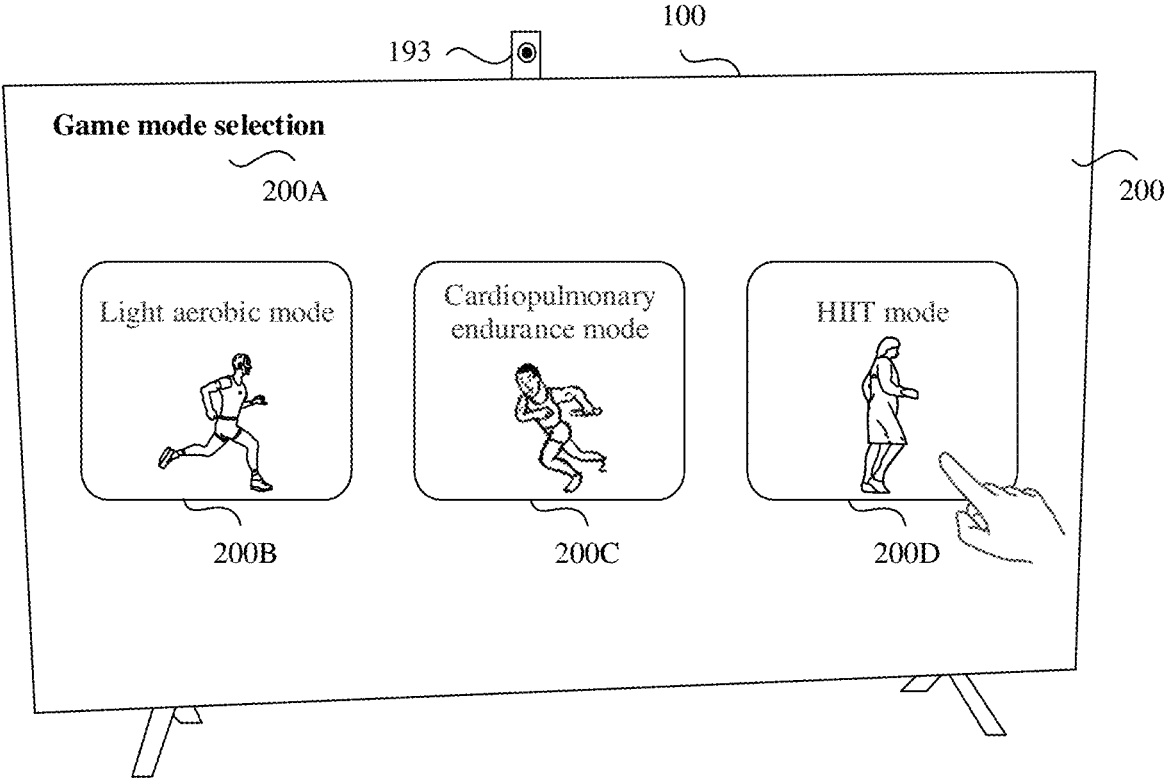
FIG. 1A to FIG. 1D, FIG. 2A, and FIG. 2B are schematic diagrams of some somatosensory interaction scenarios according to an embodiment of this application.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

A somatosensory fitness game may include a plurality of game stages. A game at each stage may include one or more game scenarios. A user may be indicated to perform a corresponding somatosensory action in a game scenario. Games at stages may have a same difficulty level or different difficulty levels. A difficulty level of a game at one stage may be determined by exercise loads of somatosensory actions that the user is indicated to perform in a plurality of game scenarios included in the game at this stage. A higher exercise load indicates higher difficulty in a game scenario and a higher difficulty level of the game at this stage. A game with a higher difficulty level indicates a higher requirement on an exercise capability of the user. Games with different difficulty levels can help the user achieve different exercise effects.

In the games with different difficulty levels, an exercise load of a somatosensory action that the user is required to perform in a game scenario of a game with each difficulty level is preset. Because different users may have differences in figures and exercise capabilities, different users may perceive different difficulty on somatosensory actions with a same exercise load. Figure data of the user may include a weight, a height, a shoulder height, and an arm length. The exercise capability may be measured by a change of a heart rate of the user in an exercise process.

For example, a somatosensory action is jumping upward 20 centimeters. A heavier user may perceive higher difficulty on the somatosensory action. A user with a shorter height (or a smaller sum of the shoulder height and the arm length) may perceive higher difficulty on the somatosensory action. A user with a higher fatness degree may perceive higher difficulty on the somatosensory action. The fatness degree may be measured by using a body mass index (body mass index, BMI). A value of the BMI may be a weight (kilogram) divided by a square of a height (meter). A higher value of the BMI may represent a higher fatness degree.

In addition, when performing somatosensory actions with a same exercise load, a user with a good exercise capability may perceive lower difficulty on the somatosensory action than a user with a poor exercise capability. Compared with the user with the poor exercise capability, a heart rate of the user with the good exercise capability may rise more slowly, and may reach a lower heart rate.

If the exercise load of the somatosensory action that the user is required to perform in the game scenario of the game with each difficulty level is constant, games with a same difficulty level may be excessively simple for some users and excessively difficult for other users. In this way, it is difficult for the somatosensory fitness game to help different users achieve better exercise effects.

In addition, an exercise capability of a same user may also be different at different times. If a user keeps exercising for a long time, an exercise capability of the user will gradually increase. If a user does not exercise for a long time, an exercise capability of the user will gradually weaken. It may be seen that, if the exercise load of the somatosensory action that the user is required to perform in the game scenario of the game with each difficulty level is constant, it is difficult for the somatosensory fitness game to help a same user achieve better exercise effects at different times.

This application provides a somatosensory interaction method. In the method, an electronic device may determine, based on a figure of a user, an exercise load of a somatosensory action that the user is indicated to perform in a game scenario of a game of each difficulty level. In addition, in a game process, the electronic device may obtain a heart rate of the user, and adjust, in real time based on the heart rate, a difficulty level of the game and an exercise load of a somatosensory action that the user is required to perform in a corresponding game scenario. In this way, exercise loads suitable for users of different figures are determined based on figures of users who actually play the game, and the exercise loads are dynamically adjusted in combination with real-time heart rates. A somatosensory fitness game can help different users achieve expected exercise effects, and avoid exercise risks caused by playing excessively difficult games by users.

The electronic device may determine an expected heart rate for performing the game at each stage. The expected heart rate may be a heart rate that the user is expected to reach when completing the game at this stage. To be specific, when a game at one stage is completed, if an actual heart rate of the user is the same as or close to an expected heart rate, the electronic device may determine that the user achieves an expected exercise effect of the game at this stage. If an actual heart rate of the user is far lower than an expected heart rate, the electronic device may determine that the user does not achieve an expected exercise effect of the game at this stage. Further, the electronic device may increase a difficulty level of a game at a next stage, so that the user performs a somatosensory action with a higher exercise load. If an actual heart rate of the user is far higher than an expected heart rate, the electronic device may determine that an exercise effect achieved by the user far exceeds an expected exercise effect of the game at this stage. Further, the electronic device may decrease a difficulty level of a game at a next stage, so that the user performs a somatosensory action with a lower exercise load.

That an actual heart rate of the user is far lower than an expected heart rate may represent that an exercise load of a somatosensory action that the user is indicated to perform in a game scenario of the game at this stage is excessively simple for the user, and cannot help the user achieve the expected exercise effect. Increasing the difficulty level of the game at the next stage can better help the user achieve the expected exercise effect. That an actual heart rate of the user is far higher than the expected heart rate may represent that an exercise load of a somatosensory action that the user is indicated to perform in a game scenario of the game at this stage is excessively difficult for the user, and is not conducive to the user to perform a game at a subsequent stage. Decreasing the difficulty level of the game at the next stage can help the user adjust a status, achieve the expected exercise effect, and avoid an exercise risk caused by excessively difficult exercise.

In this embodiment of this application, each of the foregoing game and a subsequent game may represent a somatosensory fitness game.

A division manner of the foregoing game stages is not limited in this embodiment of this application. For example, the game stages may be divided based on a preset time length. The preset time length may be a time length such as 10 seconds, 20 seconds, or 30 seconds. Alternatively, the game stages may be divided based on a quantity of times of the somatosensory action that the user is indicated to complete. The user may be indicated to complete a same quantity of times of somatosensory actions or different quantities of times of somatosensory actions in the game at each stage.

To better understand the somatosensory interaction method in this embodiment of this application, concepts of a game scenario and an exercise load are described herein.

1. Game Scenario

The game scenario may be presented by using somatosensory interaction content displayed on a screen. The game scenarios may be specifically set based on different games. For example, an electronic device displays somatosensory interaction content of a falling "banana" on the screen. A somatosensory action of the somatosensory interaction content is jumping upward. When the user performs an action of jumping upward and reaches a preset height, the "banana" can be caught. The game scenario presented by the somatosensory interaction content is a game scenario of "catching the banana". A somatosensory action of somatosensory interaction content that presents a game scenario is a somatosensory action that the user is indicated to perform in the game scenario. The "banana" can be a game item in the somatosensory fitness game.

In addition to the action of jumping upward, the somatosensory action may alternatively be squatting, jumping forward, jumping leftward, jumping rightward, raising legs, and the like. The somatosensory action is not limited in this embodiment of this application.

2. Exercise Load

The exercise load may include an amplitude of a somatosensory action, a quantity of times of completing the same somatosensory action within a same time length, and a type of the somatosensory action. The amplitude of the somatosensory action may be displacement generated when a user performs the somatosensory action. A larger amplitude of the somatosensory action indicates a higher exercise load. A larger quantity of times of completing the same somatosensory action within the same time length indicates a higher exercise load. Difficulty of different types of somatosensory actions may be different. For example, a push-up tends to be more difficult than a squat. Various types of somatosensory actions may correspond to difficulty coefficients. A somatosensory action with a higher difficulty coefficient is more difficult, and indicates a higher exercise load. A somatosensory action with a higher exercise load indicates a higher requirement on an exercise capability of the user.

It should be noted that, in a same game scenario, the user may be required to perform somatosensory actions with different exercise loads. For example, in the game scenario of "catching the banana", the "banana" may be displayed at positions of different heights on the screen. Then the user needs to jump upward to reach different preset heights. A higher preset height indicates a greater amplitude of the somatosensory action, and a higher exercise load. Alternatively, in the game scenario of "catching the banana", if a quantity of "bananas" displayed on the screen varies within a same time length, a quantity of times that the user jumps upward within the same time length varies. A higher quantity of times that the user jumps upward within the same time length indicates a higher exercise load.

In addition, in different game scenarios, the user may be indicated to perform somatosensory actions with a same exercise load. For example, in the game scenario of "catching the banana", the user needs to complete 10 times of actions of jumping upward within 20 seconds, and the user needs to jump upward to reach a preset height of 20 centimeters each time. In another game scenario, the electronic device displays somatosensory interaction content of a moving "obstacle" on the screen. A somatosensory action of the somatosensory interaction content is jumping upward. When the user jumps upward and reaches a preset height, the user can avoid the "obstacle". The game scenario presented by the somatosensory interaction content is a game scenario of "avoiding the obstacle". In the game scenario of "avoiding the obstacle", the user needs to complete 10 times of actions of jumping upward within 20 seconds, and the user needs to jump upward to reach a preset height of 20 centimeters each time. It may be seen that, an exercise load of the somatosensory action that the user is indicated to perform in the game scenario of "catching the banana" is the same as an exercise load of the somatosensory action that the user is indicated to perform in the game scenario of "avoiding the obstacle".

The game scenario and the exercise load of the somatosensory action that the user is indicated to perform in the corresponding game scenario are examples for description, and do not limit the game scenario and the exercise load in this application.

The electronic device may adjust, based on a figure of the user and a real-time heart rate in a game process, an exercise load of a somatosensory action that the user is indicated to perform in a game scenario of a game at a specific stage. Adjusting the exercise load may be one or more of adjusting an amplitude of the somatosensory action, a quantity of times of completing the same somatosensory action within a same time length, and a type of the somatosensory action.

The following describes a typical somatosensory interaction scenario.

An electronic device 100 may include a camera 193. The camera 193 may be configured to collect an image of a user in a game process. The electronic device 100 may obtain an exercise gesture of the user from the image collected by the camera 193, and analyze whether an action performed by the user is a somatosensory action that the user is indicated to perform in a game scenario and whether an amplitude of the action performed by the user matches an amplitude of a preset action. In this way, the electronic device 100 may prompt the user whether the action performed by the user is standard, score the user, or the like.

As shown in FIG. 1A, the electronic device 100 may display a game mode selection interface 200. Before starting to play a game, the electronic device 100 may receive a user operation for selecting a game mode. In different game modes, difficulty levels of games at stages may be set based on a change sequence of different difficulty levels. Different game modes may be used to achieve different exercise effects.

For example, the game mode may include a game mode for achieving a light aerobic exercise, a game mode for achieving a cardiorespiratory endurance exercise, a game mode for achieving high intensity interval training (high intensity interval training, HIIT), and the like. The game mode included in the electronic device 100 is not limited in this embodiment of this application. The change sequence of the difficulty levels of the games at the stages in different game modes may be set based on sports knowledge in the conventional technology, to achieve exercise effects corresponding to the game modes. For example, HIIT is characterized that short-term high-energy-consumption exercise is combined with a short-term rest to enable the user to continuously consume calories. In the game mode for achieving HIIT, a game with a high difficulty level and a game with a low difficulty level may be alternately played. For example, the game mode used for achieving HIIT includes games at 10 stages. Expected difficulty levels of the games at the 10 stages may be 1, 2, 3, 4, 2, 4, 2, 4, 2, 1, respectively.

A change sequence of the difficulty levels in the game mode is not limited in this embodiment of this application. A value of the difficulty level is not limited to an integer, and may also be represented by a decimal, a letter, or another character.

The game mode selection interface 200 may include a title bar 200A, a light aerobic mode option 200B, a cardiorespiratory endurance mode option 200C, and a HIIT mode option 200D.

The title bar 200A may indicate that a current page is used for display of a game mode option of the electronic device 100. The title bar 200A may be represented in a form of text information "Game mode option", a form of an icon, or another form.

The light aerobic mode option 200B, the cardiorespiratory endurance mode option 200C, and the HIIT mode option 200D may respectively indicate the electronic device 100 to display somatosensory interaction content in a light aerobic mode, somatosensory interaction content in a cardiorespiratory endurance mode, and somatosensory interaction content in a HIIT mode.

Figure 1B:
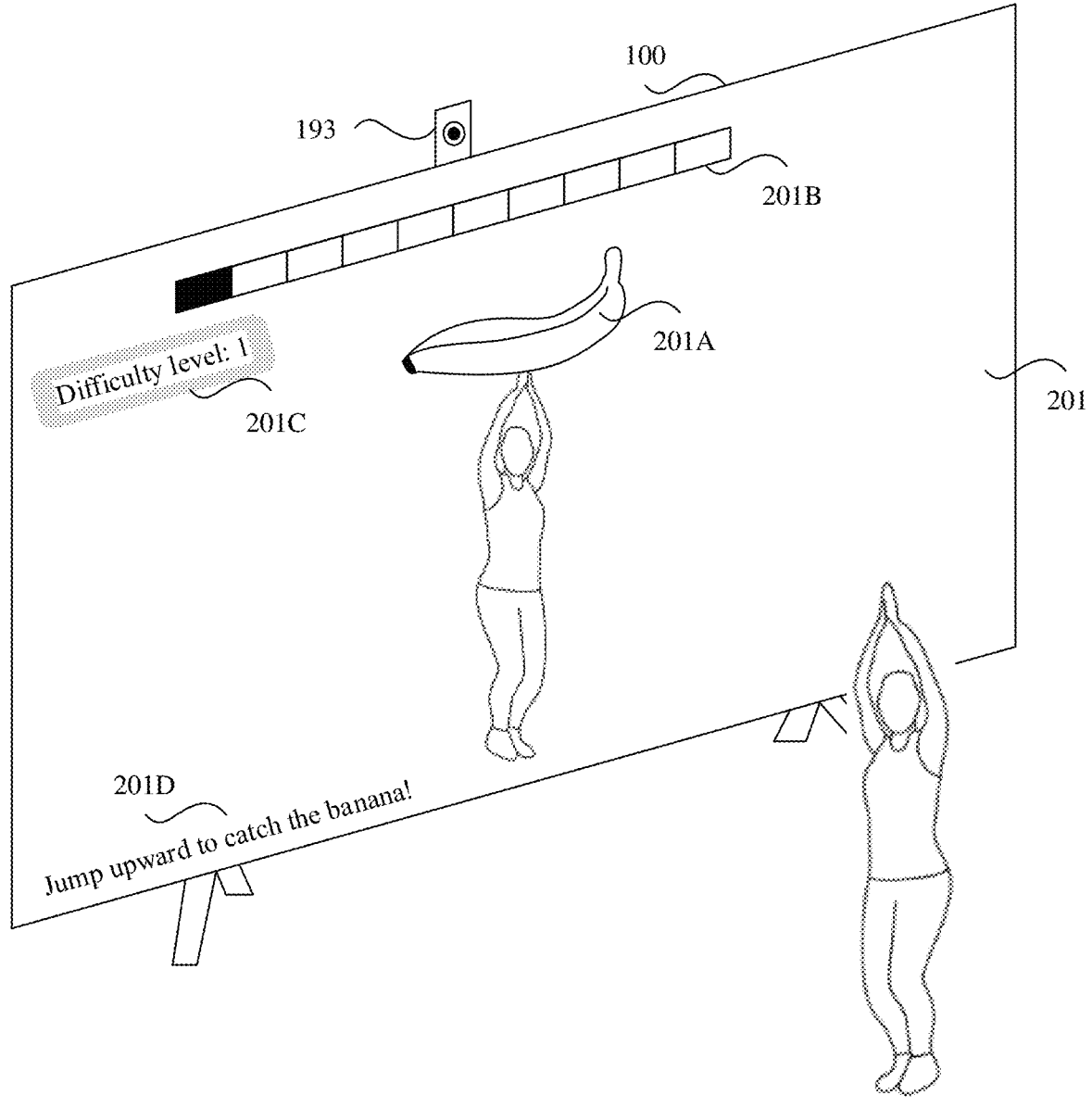

For example, in response to a user operation performed on the HIIT mode option 200D, the electronic device 100 may display a game interface 201 shown in FIG. 1B. The game interface 201 may include an item 201A, a game stage 201B, a difficulty level 201C, and an action indication 201D.

The item 201A may be a banana. A scenario represented by somatosensory interaction content in the game interface 201 is a game scenario of "catching the banana".

The game interface 201B may indicate progress of a current game. For example, the HIIT game mode includes games at 10 stages. The first rectangle in the game stage 201B may be marked black if a currently played game is a game at a first stage. A method for presenting the progress of the current game by the electronic device 100 is not limited in this embodiment of this application.

The difficulty level 201C may be used to prompt the user a difficulty level of a game at a current stage. For example, the game at the first stage has a difficulty level of 1. The difficulty level 201C may include a value of the difficulty level of the game at the first stage.

The action indication 201D may be used to prompt the user a somatosensory action of somatosensory interaction content. For example, the action indication 201D may be a text prompt "Jump upward to catch the banana". The action indication 201D may prompt the user to complete an action of jumping upward.

The game interface 201 may further include more or less content. This is not limited in this embodiment of this application.

Based on the foregoing somatosensory interaction scenario, the following specifically describes a somatosensory interaction method provided in an embodiment of this application.

Figure 1C:
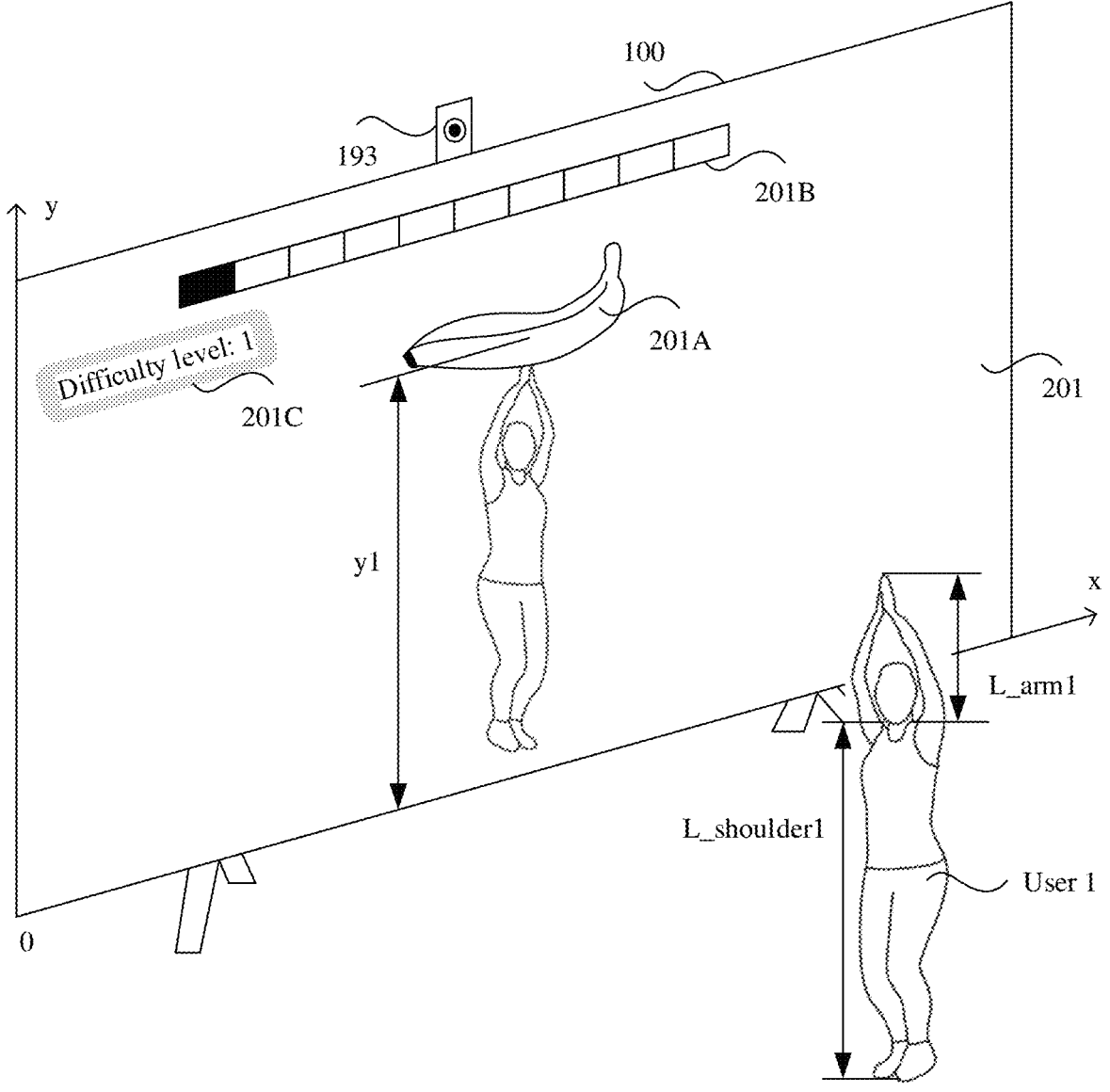
Figure 1D:
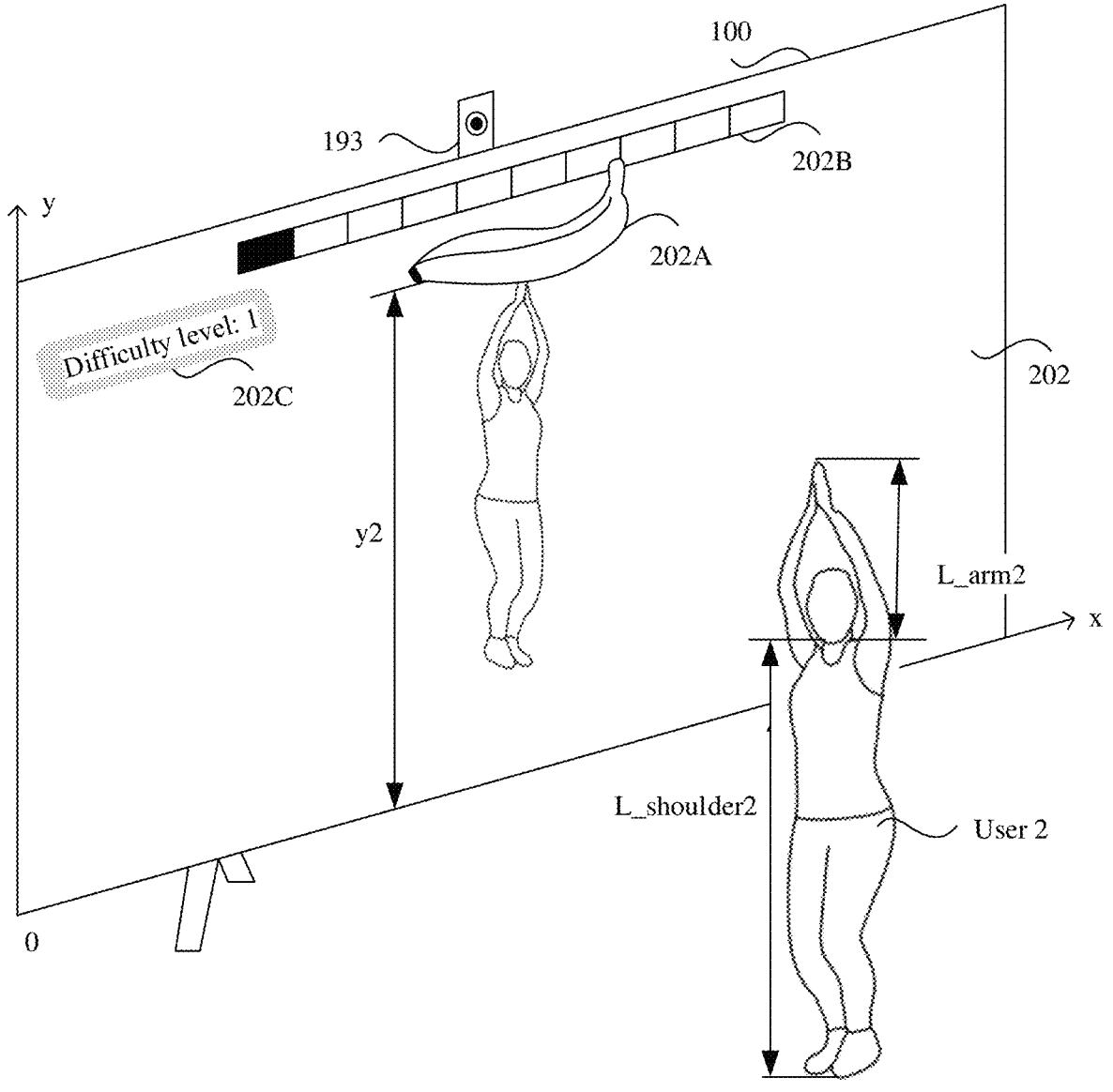

FIG. 1C and FIG. 1D are schematic diagrams of examples of scenarios in which the electronic device 100 determines, based on a figure of the user, an exercise load of an action that the user is indicated to perform in a game scenario.

Here, a game scenario in which an exercise load is adjusted by adjusting an amplitude of a somatosensory action is used as an example for description. A method for adjusting the exercise load by adjusting a quantity of times of completing the same somatosensory action within a same time length and a type of the somatosensory action will be explained in a subsequent embodiment.

In a possible implementation, the electronic device 100 may determine, based on a sum of a shoulder height and an arm length of the user, an exercise load of a somatosensory action that the user is indicated to perform in a game scenario.

In response to a user operation performed on any game mode option, the electronic device 100 may generate a game difficulty model corresponding to the game mode. The game difficulty model may include an expected difficulty level of a game at each stage in the game mode and an expected heart rate, in the game mode, that the user is expected to reach when playing the game at each stage. The expected heart rate may be set based on sports knowledge in the conventional technology. A manner of setting the expected heart rate is not limited in this embodiment of this application.

In the games with different expected difficulty levels, the user may be indicated to perform corresponding somatosensory actions in game scenarios, for example, jumping upward, squatting, jumping forward, jumping backward, jumping leftward, jumping rightward, lunging, raising legs, and burpee. A value of displacement of the somatosensory action (namely, the amplitude of the somatosensory action) may be determined by the electronic device 100 based on the sum of the shoulder height and the arm length of the user.

It may be understood that, a difficulty level of a game may be measured by a value of expected displacement per unit time that the user is expected to complete. Greater expected displacement that the user is expected to complete per unit time indicates a higher difficulty level of the game. For example, within a same time period, jumping upward 30 centimeters may be considered more difficult than jumping upward 20 centimeters. The expected displacement may be determined by pixel displacement of a specific item on a display in the game. Specifically, the expected displacement may be proportional to the pixel displacement of the specific item on the display in the game. The specific item may be set based on different game scenarios. This is not limited in this embodiment of this application.

Users with different sums of shoulder heights and arm lengths may perceive different difficulty when performing somatosensory actions with same displacement per unit time. For example, in the game scenario of "catching the banana", a pixel distance between the "banana" and the bottom of the display is y. A height that the user is expected to reach through jumping upward may be Y. Y may be obtained by the electronic device 100 through calculation based on y. In this case, a user with a sum that is of a shoulder height and an arm length and that is greater than Y may reach the height of Y without jumping upward and only raising hands. That is, the user with the sum that is of the shoulder height and the arm length and that is greater than Y does not perceive difficulty or perceives very low difficulty on a game with this difficulty level. A user with a sum that is of a shoulder height and an arm length and that is less than Y needs to raise hands upward and jump upward to reach the height of Y. That is, a user with a smaller sum that is of a shoulder height and an arm length and that is less than Y perceives higher difficulty on the game with this difficulty level.

For a manner in which the electronic device 100 determines, based on the sum of the shoulder height and the arm length of the user, the pixel displacement of the specific item on the display, refer to the following formula (1):

$$d = f(L) * \left| \frac{\left( \vec{P}_1 - \vec{P}_2 \right) * \vec{A}^T}{\Delta t} \right| \tag{1}$$

Herein, d may be an expected difficulty level that is determined by the electronic device 100 based on a game mode selected by a received user operation and that is of a game at a specific stage, L may be the sum of the shoulder height and the arm length of the user, f(L) may be a correction function with L as a variable, $\vec{P}_1$ may be pixel coordinates of an expected position of the specific item on the display at a current moment, and $\vec{P}_2$ may be pixel coordinates of an expected position of the specific item on the display at a next moment. A coordinate system in which the foregoing pixel coordinate is located may, for example, use a lower left vertex of the display of the electronic device 100 shown in FIG. 1C as an origin, use a vertical upward direction as a positive y-axis direction, and use a horizontal rightward direction as a positive x-axis direction. $\vec{A}^T = [A_x, A_y]^T$ may be a weight vector. Difficulty of moving same displacement in a horizontal direction and in a vertical direction is different. For example, jumping upward 50 centimeters is usually more difficult than jumping forward 50 centimeters. Therefore, when the difficulty level is calculated by using the pixel displacement, a weight $A_x$ occupied by displacement in the horizontal direction (namely, the x-axis direction) may be less than a weight $A_y$ occupied by displacement in the vertical direction (namely, the y-axis direction). In addition, $\Delta t$ may be a time length of playing a game with an expected difficulty level of d.

It should be noted that L may be a sum of pixel lengths that are of the shoulder height and the arm length of the user and that are determined by the electronic device 100 based on the image collected by the camera 193. Alternatively, L may be a sum of an actual shoulder height and an actual arm length of the user. The electronic device 100 may obtain a height of the user from stored user information. Then, the electronic device 100 may calculate the sum of the actual shoulder height and the actual arm length of the user based on the height of the user and a pixel length of the height of the user in the image collected by the camera 193. Alternatively, the stored user information includes data of the shoulder height and the arm length of the user. The electronic device 100 may obtain the sum of the actual shoulder height and the actual arm length of the user from the stored user information.

In addition, a specific expression of the correction function f(L) may be set based on a specific game scenario. This is not limited in this embodiment of this application. For example, the following uses an example in which L is the sum of the actual shoulder height and the actual arm length of the user for description. In the foregoing game scenario, the pixel distance between the "banana" and the bottom of the display is y, and the height that the user is expected to reach by jumping upward is Y. For the specific expression of f (L), refer to the following formula (2):

$$f(L) = \begin{cases} \alpha & L \geq Y \\ \dfrac{\beta}{L} & L < Y \end{cases} \tag{2}$$

Herein, $\alpha$ may be a positive number that approaches o, and $\beta$ may be a positive number. Specific values of $\alpha$ and $\beta$ are not limited in this embodiment of this application.

A formula for calculating the pixel displacement of the specific item on the display is not limited in this embodiment of this application.

A method for setting the coordinate system in which the foregoing pixel coordinate is located is not limited in this embodiment of this application.

As shown in FIG. 1C, a user 1 selects the game mode for achieving HIIT. The electronic device 100 may determine an expected difficulty level of a game at each stage and an expected heart rate of the user in the game at each stage. Further, the electronic device 100 may determine, based on a sum of a shoulder height and an arm length of the user, an exercise load of a somatosensory action that the user is indicated to perform in a game scenario of the game at each stage. For a manner of determining the exercise load, refer to the foregoing descriptions.

For example, the game at the first stage includes the game scenario of catching an item 201A. The item 201A may be, for example, a "banana" as shown in FIG. 1C. A specific form of the item 201A is not limited in this embodiment of this application. The user is indicated to perform a somatosensory action of jumping upward in the game scenario. A height of jumping upward (namely, an amplitude of the somatosensory action) may be determined by the electronic device 100 based on the sum of the shoulder height and the arm length of the user.

The electronic device 100 may obtain a shoulder height L_shoulder1 and an arm length L_arm1 of the user 1, and calculate a sum L1 of the shoulder height and the arm length of the user 1. The sum L1 of the shoulder height and the arm length may be a sum of pixel lengths that are of the shoulder height and the arm length of the user 1 and that are determined by the electronic device 100 based on an image collected by the camera 193. Further, the electronic device 100 may determine pixel displacement of the item 201A on the display according to the method in the foregoing embodiment. For example, $\vec{P}_1$ in the foregoing formula (1) may be (x1, 0). The electronic device 100 may obtain a pixel coordinate (x1, y1) of an expected position of the item 201A at a next moment through calculation. That is, a pixel distance between the item 201A and the bottom of the display is y1. In this way, the electronic device 100 may determine, based on y1, an actual height that the user is expected to reach by jumping upward, and may determine, based on the image collected by the camera 193, whether the amplitude of the somatosensory action performed by the user reaches an expected amplitude.

The electronic device 100 may display a game interface 201 shown in FIG. 1C. The game interface 201 may include the item 201A, a game stage 201B, and a difficulty level 201C. The item 201A may be located at a position of a pixel coordinate whose distance from the bottom of the display is y1. Herein, y1 may be determined according to the foregoing method. Details are not described herein again. For functions of the game stage 201B and the difficulty level 201C, refer to the embodiment shown in FIG. 1B. Details are not described herein again.

As shown in FIG. 1D, a user 2 also selects the game mode for achieving HILT. The electronic device 100 may display a game interface 202. The game interface 202 may present a game scenario used to indicate the user to exercise. A game scenario of a game at the first stage may be the game scenario of "catching the banana". The user is indicated to perform an action of jumping upward in the game scenario. The electronic device 100 may determine, according to the method in the foregoing embodiment, a height that the user is expected to reach by jumping upward.

Specifically, the electronic device 100 may obtain a shoulder height L_shoulder2 and an arm length L_arm2 of the user 2, and calculate a sum L2 of the shoulder height and the arm length of the user 2. The sum L2 of the shoulder height and the arm length may be a sum of pixel lengths that are of the shoulder height and the arm length of the user 2 and that are determined by the electronic device 100 based on an image collected by the camera 193. Further, the electronic device 100 may determine that a pixel distance between the item 202A and the bottom of the display is y2. In this way, the electronic device 100 may determine, based on y2, an expected height that the user is expected to reach by jumping upward.

The game interface 202 may specifically include the item 202A, a game stage 202B, and a difficulty level 202C. For descriptions of the game stage 202B and the difficulty level 202C, refer to the foregoing descriptions of the game stage 201B and the difficulty level 201C respectively. Details are not described herein again. The game interface 202 may further include more or less content. This is not limited in this embodiment of this application.

As shown in FIG. 1C and FIG. 1D, the sum L2 of the shoulder height and the arm length of the user 2 is greater than the sum L1 of the shoulder height and the arm length of the user 1. In this case, in the game at the first stage of the game mode for achieving HIIT, a value of y2 is greater than a value of y1. That is, when performing an action of jumping upward, an expected position reached by a highest point of a body when the user 2 jumps upward is higher than an expected position reached by a highest point of a body when the user 1 jumps upward. It may be understood that the sum of the shoulder height and the arm length of the user 2 is greater. When the highest point of the body of the user 1 and the highest point of the body of the user 2 reach a same position when jumping upward, the user 2 perceives a lower difficulty.

It may be learned from the foregoing method that, the electronic device 100 determines, based on sums of shoulder heights and arm lengths of users, exercise loads of actions that the users are indicated to perform in a game scenario of a game at a same stage, so that different users perceive same or similar difficulty when playing the game at the same stage. This helps different users achieve expected exercise effects.

The game scenarios shown in FIG. 1C and FIG. 1D are not limited in this embodiment of this application. The electronic device 100 may indicate the user to perform actions such as jumping upward, squatting, lunging, and burpee by using another game scenario.

Optionally, in addition to the sum of the shoulder height and the arm length, the electronic device 100 may further determine, based on the height of the user, an exercise load of an action that the user is indicated to perform in the game scenario of the game at each stage. For a specific imple-mentation, refer to the foregoing embodiment.

In this embodiment of this application, the electronic device 100 may adjust, with reference to impact of the sum of the shoulder height and the arm length of the user on difficulty perception by the user in a game process, the exercise load of the action that the user is indicated to perform in the game scenario of the game at each stage. This enables the game at each stage to better help different users achieve expected exercise effects. In addition, in the game process, the electronic device 100 may further determine, based on a real-time heart rate of the user, whether an exercise load of an action that the user is indicated to perform in a game scenario of a game at a current stage is appropriate, and adaptively adjust a difficulty level of a game at a next stage and an exercise load of an action that the user is indicated to perform in a game scenario of the game at the next stage.

The following specifically describes an implementation in which the electronic device 100 adjusts, based on the real-time heart rate of the user, an exercise load of an action that the user is indicated to perform in a game scenario.

Figure 2A:
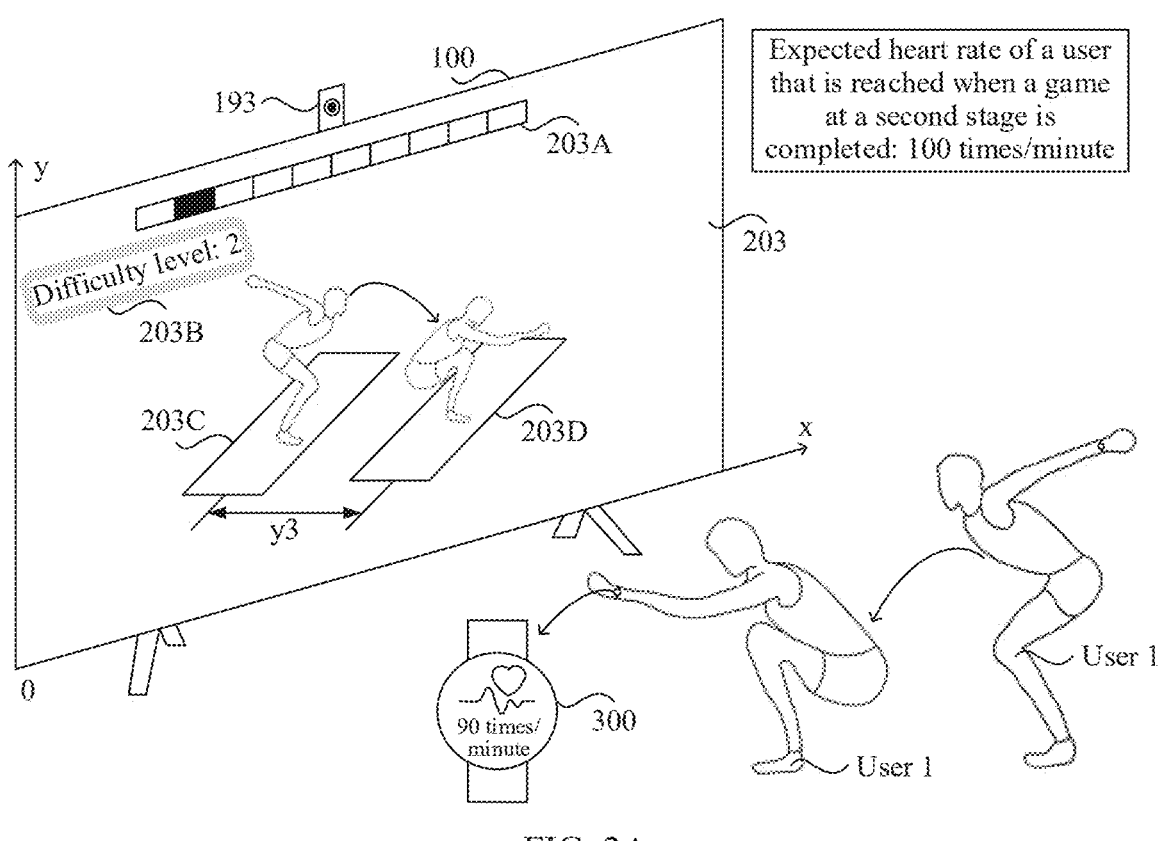
Figure 2B:
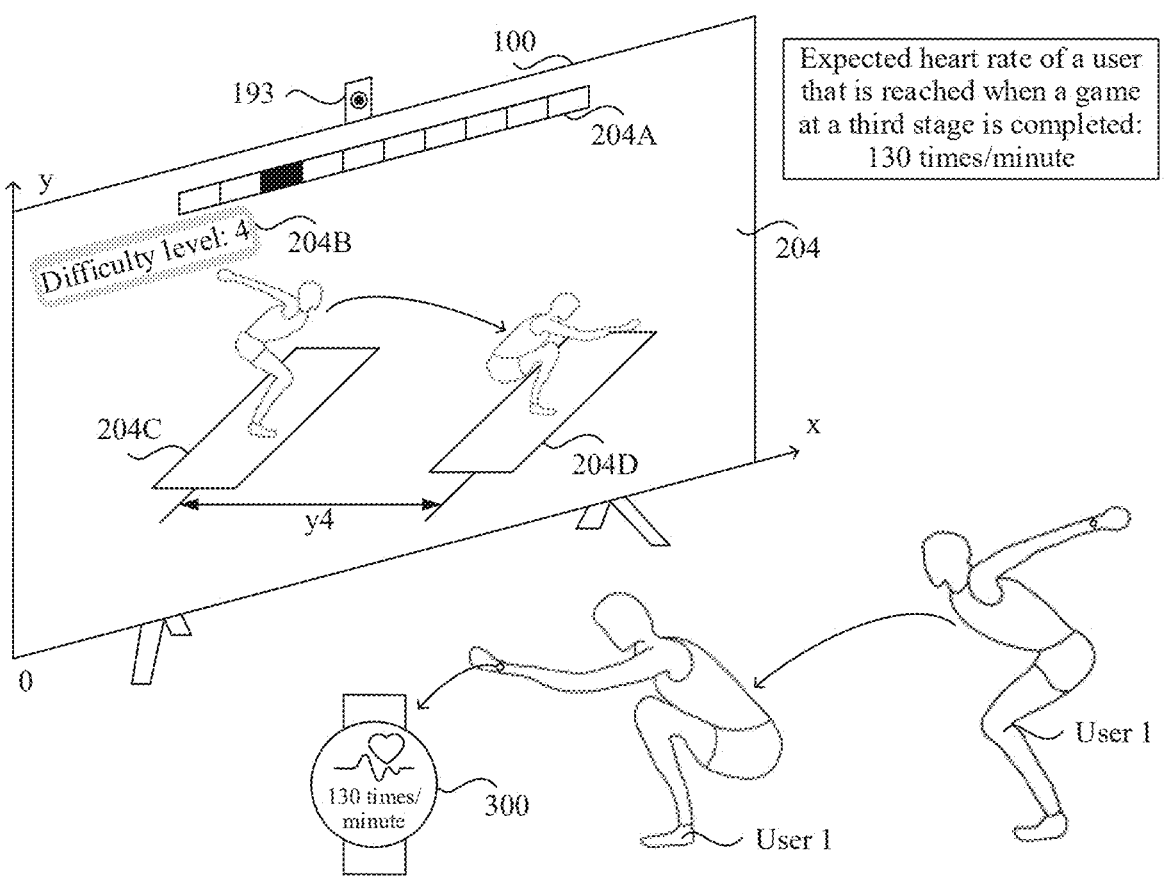

FIG. 2A and FIG. 2B are schematic diagrams of examples of scenarios in which the electronic device 100 adjusts, based on a real-time heart rate of a user, an exercise load of an action that the user is indicated to perform in a game scenario.

The electronic device 100 may receive a user operation of selecting a game mode for achieving HIIT. The electronic device 100 may determine that the game mode for achieving HIIT includes games at 10 stages. Expected difficulty levels of the games at the 10 stages may be 1, 2, 3, 4, 2, 4, 2, 4, 2, 1, respectively. In addition, the electronic device 100 may further determine, based on sports knowledge in the con-ventional technology, expected heart rates that the user is expected to reach in playing the games at the 10 stages.

An expected heart rate in a game at one stage may be a heart rate that the user is expected to reach when completing the game at this stage, or may be an average heart rate that the user is expected to reach when playing the game at this stage. A specific calculation method of the expected heart rate is not limited in this embodiment of this application.

Specifically, an example in which the expected heart rate in the game at one stage is the heart rate that the user is expected to reach when completing the game at this stage is used for description herein.

Further, the electronic device 100 may obtain figure data of the user, for example, a sum of a shoulder height and an arm length of the user, and determine, according to the method in the embodiments shown in FIG. 1C and FIG. 1D, an exercise load of a somatosensory action that the user is indicated to perform in a game scenario of the game at each stage.

For example, when a game at a second stage is played, the electronic device 100 may display a game interface 203 shown in FIG. 2A.

The game at the second stage may include a game scenario of "jumping to a plank". The electronic device may display, in the game interface 203, a plurality of "planks" that are spaced by a specific distance. A position of the "plank" is a position at which the user can stay. The user needs to jump from one "plank" to a next "plank" to avoid falling into a position at which a space between the two "planks" is located. In the foregoing game scenario, the user may be indicated to perform an action of jumping forward. The foregoing "plank" may be the item in the foregoing embodiment.

As shown in FIG. 2A, the game interface 203 may include a game stage 203A, a difficulty level 203B, an item 203C, and an item 203D. For descriptions of the game stage 203A and the difficulty level 203B, refer to the foregoing descrip-tions of the game stage 201B and the difficulty level 201C in FIG. 1C. The second rectangle marked black in the game stage 203A may represent that a stage at which a current game is located is the second stage. The difficulty level 203B may indicate that a difficulty level of the game at the second stage is 2. Both the item 203C and the item 203D may be the foregoing "planks". The item 203C and the item 203D may be spaced by a pixel distance of y3. The game interface 203 may further include more or less content. This is not limited in this embodiment of this application.

The user 1 may perform an action of jumping forward based on an indication in the game scenario of "jumping to a plank". The user 1 may wear a heart rate detection apparatus 300, for example, a band that can detect a heart rate. The electronic device 100 may establish a communi-cation connection to the heart rate detection apparatus 300, and obtain an actual heart rate of the user 1 from the heart rate detection apparatus 300. The communication connec-tion between the electronic device 100 and the heart rate detection apparatus 300 may be a wireless connection (a Bluetooth connection, a near field communication connec-tion, a WLAN direct connection, or the like) or a wired connection in the conventional technology. For a specific manner of communication between the electronic device 100 and the heart rate detection apparatus 300, refer to the conventional technology. Details are not described herein.

When the game at the second stage is completed, the electronic device 100 may compare an expected heart rate in the game at the second stage with an actual heart rate of the user 1 obtained from the heart rate detection apparatus 300, to determine whether an exercise load of a somatosensory action that the user is indicated to perform in a game scenario of the game at the second stage is appropriate. The actual heart rate of the user 1 may be an actual heart rate of the user 1 reached when the user 1 completes the game at the second stage.

If the actual heart rate is lower than the expected heart rate, for example, a value obtained by subtracting the actual heart rate from the expected heart rate is greater than a1, or the actual heart rate is lower than b1 times of the expected heart rate, the electronic device 100 may determine that the user does not achieve an expected exercise effect in the game at the second stage. Herein, a1 and b1 may be preset thresholds. A value of a1 may be, for example, a positive number such as 1, 2, 3, 4, or 5, and b1 may be a positive number less than 1, for example, 0.95, 0.9, or the like. Specific values of a1 and b1 are not limited in this embodi-ment of this application. That is, the game at the second stage is excessively simple for the user 1. The electronic device 100 may increase a difficulty level of a game at a third stage based on an expected difficulty level of a game at a next stage (namely, the third stage).

In a possible implementation, a method in which the electronic device 100 increases the difficulty level of the game at the third stage may be: The electronic device 100 increases the difficulty level by one level based on the expected difficulty level of the game at the third stage. For example, if the expected difficulty level of the game at the third stage is 3, the difficulty level may be 4 after the difficulty level is increased by one level. The electronic device 100 may adjust the difficulty level of the game at the third stage to 4, and determine, based on an adjusted difficulty level, an exercise load of a somatosensory action that the user is indicated to perform in a game scenario of the game at the third stage. Alternatively, the electronic device 100 increases the difficulty level by N levels based on the expected difficulty level of the game at the third stage. N is a positive number. A specific value of N may be determined by a difference between the expected heart rate and the actual heart rate. A larger difference between the expected heart rate and the actual heart rate indicates a larger value of N. It may be understood that, if the actual heart rate is much lower than the expected heart rate, the user perceives lower difficulty on the game at this stage, and a difference between an exercise effect achieved by the user and an expected exercise effect is larger. In this case, the electronic device 100 may increase the difficulty level of the game at the next stage by a larger extent, to help the user achieve the expected exercise effect.

A specific method for calculating N is not limited in this embodiment of this application.

If the actual heart rate is higher than the expected heart rate, for example, a value obtained by subtracting the expected heart rate from the actual heart rate is greater than a2, or the actual heart rate is greater than b2 times of the expected heart rate, the electronic device 100 may determine that an exercise effect achieved by the user in the game at the second stage exceeds an expected exercise effect. Herein, a2 and b2 may be preset thresholds. A value of a2 may be, for example, a positive number such as 1, 2, 3, 4, or 5, and b2 may be a positive number greater than 1, for example, 1.05, 1.1, or the like. Specific values of a2 and b2 are not limited in this embodiment of this application. That is, the game at the second stage is excessively difficult for the user 1. The electronic device 100 may decrease a difficulty level of a game at the third stage based on an expected difficulty level of the game at the third stage.

For a method for decreasing the difficulty level of the game at the third stage by the electronic device 100, refer to the foregoing method for increasing the difficulty level of the game at the third stage by the electronic device 100. Details are not described herein again.

If the actual heart rate is equal to the expected heart rate, or a difference between the actual heart rate and the expected heart rate is less than a3, the electronic device 100 may determine that an exercise effect achieved by the user in the game at the second stage is the same as or close to an expected exercise effect. Herein, a3 may be a preset threshold. A value of a3 may be, for example, a positive number such as 1, 2, 3, 4, or 5. A specific value of a3 is not limited in this embodiment of this application. That is, the game at the second stage is appropriate to the user 1. The electronic device 100 may indicate the user to exercise based on an expected difficulty level of the game at the third stage.

The foregoing method for comparing the expected heart rate with the actual heart rate is not limited in this embodiment of this application. The electronic device 100 may further compare the expected heart rate with the actual heart rate by using another method, to determine whether an exercise load of a somatosensory action that the user is indicated to perform in a game scenario of a game at a current stage is appropriate to the user.

For example, the expected heart rate of the user that is reached when the game at the second stage is completed is 100 times/minute. If the actual heart rate reached when the user completes the game at the second stage is lower than 95 times/minute, the electronic device 100 may determine that the user does not achieve the expected exercise effect. If the actual heart rate reached when the user completes the game at the second stage is higher than 105 times/minute, the electronic device 100 may determine that the exercise effect achieved by the user exceeds the expected exercise effect. If the actual heart rate reached when the user completes the game at the second stage is greater than or equal to 95 times/minute and is less than or equal to 105 times/minute, the electronic device 100 may determine that the exercise effect achieved by the user is close to the expected exercise effect.

As shown in FIG. 2A, the heart rate detection apparatus 300 detects that the actual heart rate reached when the user 1 completes the game at the second stage is 90 times/minute. The electronic device 100 may obtain the heart rate detected by the heart rate detection apparatus 300. Because the actual heart rate is lower than 95 times/minute, the electronic device 100 may increase the difficulty level of the game at the third stage. For example, in the game mode for achieving HIIT, the expected difficulty level of the game at the third stage is 3. The electronic device 100 may increase the difficulty level of the game at the third stage to 4, and determine, based on an adjusted difficulty level, an exercise load of a somatosensory action that the user is indicated to perform in the game scenario of the game at the third stage.

As shown in FIG. 2B, when the difficulty level and the exercise load of the game at the third stage are adjusted, the electronic device 100 may display a game interface 204. In a game scenario presented by the game interface 204, the user may be indicated to complete the somatosensory action corresponding to the game at the third stage. Specifically, the game interface 204 may include a game stage 204A, a difficulty level 204B, an item 204C, and an item 204D. For descriptions of the game stage 204A and the difficulty level 204B, refer to the foregoing descriptions of the game stage 201B and the difficulty level 201C in FIG. 1C. The third rectangle marked black in the game stage 204A may represent that a stage at which a current game is located is the third stage. The difficulty level 204B may indicate that the difficulty level of the game at the third stage is 4. Both the item 204C and the item 204D may be the foregoing "planks". The item 204C and the item 204D may be spaced by a pixel distance of y4. The game interface 204 may further include more or less content. This is not limited in this embodiment of this application.

The pixel distance y4 between the item 204C and the item 204D shown in FIG. 2B is greater than the pixel distance y3 between the item 203C and the item 203D shown in FIG. 2A. That is, the user 1 performs a somatosensory action with a greater amplitude in a process of the game at the third stage. During the game at the second stage, the user 1 perceives low difficulty on the game at this stage. The electronic device 100 increases the difficulty level of the game at the third stage, to increase the exercise load of the user 1, so as to help the user 1 achieve the expected exercise effect.

For example, an expected heart rate of the user that is reached when the game at the third stage is completed is 130 times/minute. The heart rate detection apparatus 300 detects that an actual heart rate reached when the user 1 completes the game at the third stage is 130 times/minute. The electronic device 100 may obtain the heart rate detected by the heart rate detection apparatus 100, and determine that the actual heart rate is equal to the expected heart rate. In this case, in a game at a fourth stage, the electronic device 100 may indicate the user to exercise based on an expected difficulty level of the game at the fourth stage.

The game scenarios of the game at the second stage and the game at the third stage are not limited in this embodiment of this application.

It may be learned from the foregoing method that, in a game process, the electronic device 100 may compare an actual heart rate and an expected heart rate of the user to determine whether an exercise load of a somatosensory action that the user is indicated to perform in a game scenario of a game at a current stage is appropriate. The electronic device 100 may adaptively adjust a difficulty level and an exercise load of a game based on an exercise capability of the user in a game process, to guide the user to adjust exercise intensity. In this way, the somatosensory fitness game can help the user better achieve the expected exercise effect, and can avoid an exercise risk caused by performing excessively difficult exercise by the user.

The following describes in detail an implementation in which the electronic device 100 adjusts an exercise load of a somatosensory action by adjusting an amplitude of the somatosensory action.

It may be understood that the somatosensory fitness game may indicate the user to generate displacement in all directions (for example, forward, backward, upward, downward, leftward, and rightward) during a game process by using a game scenario, to achieve a purpose of exercise. Greater displacement generated within a same time period indicates a higher exercise load. For example, when actions of jumping upward are performed within a same time period, an exercise load of an action of jumping upward 20 centimeters is usually higher than that of an action of jumping upward 10 centimeters.

The foregoing displacement that the user is expected to reach when doing an exercise may be determined based on pixel displacement of an item on the display or a pixel distance between different items on the display in a game scenario. For example, a pixel distance between the item 203C and the item 203D on the display shown in FIG. 2A is y3. Actual displacement that the user is expected to reach through jumping forward in the game scenario may be in a preset proportion to y3.

After adjusting a difficulty level of a game, the electronic device 100 may adjust the pixel displacement of the item on the display or the pixel distance between different items on the display in the game scenario according to the following formula (3):

$$d' = \left| \frac{\left(\vec{P}_1 - \vec{P}_2\right) * \vec{A}^T}{\Delta t} \right| \tag{3}$$

The foregoing formula (3) may be used to represent a relationship between the difficulty level of the game and the pixel displacement of the item on the display in the game scenario, or a relationship between the difficulty level of the game and the pixel distance between different items on the display in the game scenario. Herein, d' may represent an adjusted difficulty level of the game. $\vec{P}_1$ and $\vec{P}_2$ may respectively represent pixel coordinates of expected positions of the item on the display at two consecutive moments, or may respectively represent pixel coordinates of expected positions of two items on the display at a same moment. For example, as shown in FIG. 2A, $\vec{P}_1$ may represent pixel coordinates of the item 203C on the display, and $\vec{P}_2$ may represent pixel coordinates of the item 203D on the display. For a coordinate system in which the foregoing pixel coordinates are located, refer to the coordinate system shown in FIG. 1C. Details are not described herein again.

$\vec{A}^T = [A_x, A_y]^T$ may be a weight vector. $A_x$ may be a weight occupied when displacement in an x-axis direction (for example, a horizontal direction) is used to measure the difficulty level. $A_y$ may be a weight occupied when displacement in a y-axis direction (for example, a vertical direction) is used to measure the difficulty level. $\Delta t$ may be a time length of playing a game with an expected difficulty level of d'.

The foregoing method for adjusting the pixel displacement of the item on the display or the pixel distance of different items on the display in the game scenario is not limited in this embodiment of this application. In addition to the foregoing formula (3), the relationship between the difficulty level of the game and the pixel displacement of the item on the display in the game scenario, or the relationship between the difficulty level of the game and the pixel distance of different items on the display in the game scenario may alternatively be represented by using another relationship formula, specifically, may be determined based on different games and game scenarios in the games.

When the electronic device 100 determines, by using the foregoing method, a change of the pixel coordinates of the item on the display in the game scenario, the electronic device 100 may draw a game interface on the display by using a game engine. In this way, the electronic device 100 may display a game scenario in the game with an adjusted difficulty level, to guide the user to complete a somatosensory action indicated in the game scenario with adjusted difficulty. An exercise load of the somatosensory action indicated in the game scenario with the adjusted difficulty can better match an exercise capability of the user, thereby helping the user achieve an expected motion effect.

The electronic device may determine, based on a figure of the user, the exercise load of the somatosensory action that the user is indicated to perform in the game scenario. In addition to the shoulder height and the arm length, the figure data of the user may further include a weight of the user.

In a possible implementation, the electronic device 100 determines, based on the weight of the user, an exercise load of a somatosensory action that the user is indicated to perform in a game scenario.

Before starting to play a game, the electronic device 100 may receive a user operation of the user for selecting a game mode. The electronic device 100 may determine, based on the game mode, an expected difficulty level of a game at each stage and an expected heart rate in the game at each stage in the game mode.

It may be understood that users with different weights may perceive different difficulty when doing an exercise with same displacement per unit time. For example, in the game scenario of "catching the banana" in the foregoing embodiment, a pixel distance between the "banana" and the bottom of the display is y. A height that the user is expected to reach by jumping upward is Y. A heavier user does more work to jump upward to the height Y above the ground and may perceive higher difficulty on this action.

For a manner in which the electronic device 100 determines pixel displacement of the item on the display based on the weight of the user, refer to the following formula (4):

$$d = g(m) * \left| \frac{\left(\vec{P}_1 - \vec{P}_2\right) * \vec{A}^T}{\Delta t} \right| \tag{4}$$

Herein, d may be an expected difficulty level that is determined by the electronic device 100 based on a game mode selected by a received user operation and that is of a game at a specific stage, m may be the weight of the user, m may be obtained by the electronic device 100 from stored user information, and g(m) may be a correction function with m as a variable. For $\vec{P}_1$ $\vec{P}_2$, $\vec{A}^T$ and $\Delta t$, refer to the descriptions of the foregoing formula (1).

A specific expression of the correction function g(m) may be set based on a specific game scenario. This is not limited in embodiments of this application. For example, a specific expression g(m) of may be g(m)=λ*m. Herein, λ may be a positive number. A specific value of λ is not limited in this embodiment of this application.

It may be learned from the foregoing method that, the electronic device 100 determines, based on weights of users, exercise loads of somatosensory actions that the users are indicated to perform in a game scenario of a game at a same stage, so that the users with different weights perceive same or similar difficulty when playing the game at a same stage. This helps different users achieve expected exercise effects.

In a possible implementation, the electronic device 100 may determine, based on a BMI of the user, an exercise load of a somatosensory action that the user is indicated to perform in a game scenario.

Same as the manner in which the electronic device 100 determines, based on the sum of the shoulder height and the arm length of the user or the weight of the user, the exercise load of the somatosensory action that the user is indicated to perform in the game scenario in the foregoing embodiment, before starting to play a game, the electronic device 100 may receive a user operation of the user for selecting a game mode. Then, the electronic device 100 may determine, based on the game mode, an expected difficulty level of a game at each stage and an expected heart rate in the game at each stage in the game mode.

It may be understood that the BMI may be used to measure a fatness degree the user. Users of different fatness degrees may perceive different difficulty when doing an exercise with same displacement per unit time. For example, when performing an action of jumping upward 20 centimeters, a user with a higher fatness degree usually perceives higher difficulty on this action.

For a manner in which the electronic device 100 determines pixel displacement of the item on the display in the game scenario based on the fatness degree of the user, refer to the following formula (5):

$$d = h(BMI) * \left| \frac{\left( \vec{P}_1 - \vec{P}_2 \right) * \vec{A}^T}{\Delta t} \right| \quad (5)$$

For d, $\vec{P}_2$, $\vec{A}^T$, and $\Delta t$, refer to the descriptions of the foregoing formula (1). The BMI may represent a value of the fatness degree the user, and h(BMI) may represent a correction function with BMI as a variable. A specific expression of the correction function h(BMI) may be set based on a specific game scenario. This is not limited in embodiments of this application.

For example, a specific expression h(BMI) of may be h(BMI)=η*BMI. Herein, η may be a positive number. A specific value of η is not limited in this embodiment of this application.

The BMI is calculated based on two parameters: the height and the weight. Determining difficulty that different users perceive on a same somatosensory action based on fatness degrees is more accurate than determining the difficulty that different users perceive on the same somatosensory action based on only the sums of the shoulder heights and the arm lengths of the users or based on only the weights of the users. That is, a method in which the electronic device 100 determines, based on BMIs of users, exercise loads of somatosensory actions that the users are indicated to perform in a game scenario of a game at a same stage, so that different users perceive same or similar difficulty when playing the game at a same stage. This helps different users achieve expected exercise effects.

In addition to the height, the weight, the shoulder height, and the arm length, the figure data of the user may further include other types of body parameters, for example, a body fat percentage. A method in which the electronic device 100 determines, based on the figure of the user, the exercise load of the somatosensory action that the user is indicated to perform in the game scenario is not limited in this embodiment of this application.

It should be noted that, after the electronic device 100 determines, based on the weight of the user or based on the BMI of the user, the exercise load of the somatosensory action that the user is indicated to perform in the game scenario of the game at each stage, the electronic device 100 may further adjust, in the game process in real time according to the method in the foregoing embodiments shown in FIG. 2A and FIG. 2B, the exercise load of the somatosensory action that the user is indicated to perform in the game scenario of the game at each stage. That is, in the game process, the electronic device 100 may determine, based on the actual heart rate of the user, whether an exercise load of a somatosensory action that the user is indicated to perform in a game scenario of a game at a current stage is appropriate, and adjust the exercise load to match the exercise capability of the user, to help the user achieve an expected exercise effect of the game at each stage.

In some embodiments, in addition to adjusting the exercise load of the somatosensory action that the user is indicated to perform in the game scenario of the game at each stage by adjusting an amplitude of the somatosensory action, the electronic device 100 may further adjust a quantity of times of completing the same somatosensory action within a same time length or adjust a type of the somatosensory action, to adjust the exercise load of the somatosensory action that the user is indicated to perform in the game scenario of the game at each stage.

1. The electronic device 100 may adjust, by adjusting the quantity of times of completing the same somatosensory action within the same time length, the exercise load of the somatosensory action that the user is indicated to perform in the game scenario of the game at each stage.

When the electronic device 100 determines, based on an actual heart rate reached when the user completes a game at a specific stage, that the user does not achieve an expected exercise effect of the game at this stage, the electronic device 100 may increase an exercise load of a somatosensory action that the user is indicated to perform in a game scenario of a game at a next stage. Specifically, the electronic device 100 may increase a quantity of times of the somatosensory action that the user is indicated to perform within a same time period. For example, in the game scenario of the game at the next stage, the user is indicated to complete 30 times of actions of squatting within 30 seconds. The electronic device 100 may adjust the game scenario of the game at the next stage to indicate the user to complete 40 times of actions of squatting within 30 seconds. It may be understood that a larger quantity of times of completing the somatosensory action within the same time period indicates a higher exercise load.

In a possible implementation, a specific value of an increased quantity of times of the somatosensory action may be determined based on a difference between an actual heart rate and an expected heart rate of the user. If an actual heart rate reached when the user completes a game at a specific stage is much lower than an expected heart rate, the user perceives lower difficulty on the game at this stage, and an exercise capability of the user is stronger. In this case, the electronic device 100 may increase a quantity of times of a somatosensory action that the user is indicated to complete in a game scenario of a game at a next stage.

In this embodiment of this application, a method in which the electronic device 100 increases the quantity of times of completing the same somatosensory action within the same time period is not limited.

When the electronic device 100 determines, based on an actual heart rate reached when the user completes a game at a specific stage, that an exercise effect achieved by the user far exceeds an expected exercise effect of the game at this stage, the electronic device 100 may decrease an exercise load of a somatosensory action that the user is indicated to perform in a game scenario of a game at a next stage. Specifically, the electronic device 100 may decrease a quantity of times of the somatosensory action that the user is indicated to perform within a same time period. For example, in the game scenario of the game at the next stage, the user is indicated to complete 30 times of actions of squatting within 30 seconds. The electronic device 100 may adjust the game scenario of the game at the next stage to a game scenario in which the user is indicated to complete 20 times of actions of squatting within 30 seconds. It may be understood that a smaller quantity of times of completing the somatosensory action within the same time period indicates a lower exercise load.

For a method in which the electronic device 100 decreases the quantity of times of completing the somatosensory action within the same time period, refer to the foregoing method in which the electronic device 100 increases the quantity of times of completing the somatosensory action within the same time period.

A change of the game scenario may be specifically represented as a change of somatosensory interaction content displayed on the display.

Specifically, when the user needs to be indicated to complete a larger quantity of times or smaller quantity of times of the somatosensory action within the same time period, pixel coordinates of a related item in the game scenario on the display needs to be correspondingly changed. The electronic device 100 may calculate a change of the pixel coordinates of the item on the display in the game scenario, and draw a game interface by using a game engine. In this way, the user may complete the somatosensory action based on an indication in the game scenario on the game interface. The game scenario presented on the game interface is obtained after the electronic device 100 performs adjustment based on the actual heart rate of the user. The exercise load of the somatosensory action that the user is indicated to perform in the game scenario can better match the exercise capability of the user. This helps the user achieve the expected exercise effect.

2. The electronic device boo may adjust, by adjusting the type of the somatosensory action, the exercise load of the somatosensory action that the user is indicated to perform in the game scenario of the game at each stage.

When the electronic device 100 determines, based on an actual heart rate reached when the user completes a game at a specific stage, that the user does not achieve an expected exercise effect of the game at this stage, the electronic device 100 may increase an exercise load of a somatosensory action that the user is indicated to perform in a game scenario of a game at a next stage. Specifically, the electronic device 100 may add a somatosensory action with higher difficulty or replace a somatosensory action with low difficulty with a somatosensory action with high difficulty in the game at the next stage.

When the electronic device 100 determines, based on an actual heart rate reached when the user completes a game at a specific stage, that an exercise effect achieved by the user exceeds an expected exercise effect of the game at this stage, the electronic device 100 may decrease an exercise load of a somatosensory action that the user is indicated to perform in a game scenario of a game at a next stage. Specifically, the electronic device 100 may remove a somatosensory action with high difficulty or replace a somatosensory action with high difficulty with a somatosensory action with low difficulty in the game at the next stage.

A somatosensory action that the user is indicated to perform in a game scenario of a game at one stage may include one or more types of somatosensory actions. Different types of somatosensory actions may include, for example, jumping upward, squatting, jumping forward, jumping backward, jumping leftward, jumping rightward, lunging, raising legs, and a push-up. Difficulty of different types of somatosensory actions is different, and sizes and directions of displacement generated by completing different types of somatosensory actions are usually different. For example, doing a push-up is more difficult than jumping forward. Doing a push-up may generate vertical displacement. Jumping forward may generate horizontal displacement. Maximum displacement that can be generated by jumping forward is usually greater than maximum displacement that can be generated by doing a push-up.

Different types of somatosensory actions may be marked with corresponding difficulty coefficients. That is, in a game scenario in which the user is indicated to perform a somatosensory action of a specific type may be marked with a corresponding difficulty coefficient. For example, a difficulty coefficient corresponding to a push-up may be higher than a difficulty coefficient corresponding to a forward jump.

The above difficulty coefficient may be used to calculate a difficulty level of a game. For example, in a game scenario of a game at a specific stage, a somatosensory action that the user is indicated to perform includes q different types of somatosensory actions. Difficulty coefficients corresponding to the q different types of somatosensory actions may be $c_1$, $c_2$, . . . , and $c_q$, respectively. Herein, q is a positive integer. Specific values of difficulty coefficients corresponding to different types of somatosensory actions are not limited in this embodiment of this application.

For a relationship between the difficulty level of the game and the pixel coordinates of the item displayed on the display in the game at this stage, refer to the following formula (6):

$$d = c_1 * \left| \frac{\left( \vec{P}_{11} - \vec{P}_{12} \right) * \vec{A}^T}{\Delta t_1} \right| + \ldots + \tag{6}$$

-continued $$c_i * \left| \frac{\left( \vec{P}_{i1} - \vec{P}_{i2} \right) * \vec{A}^T}{\Delta t_i} \right| + \ldots + c_q * \left| \frac{\left( \vec{P}_{q1} - \vec{P}_{q2} \right) * \vec{A}^T}{\Delta t_q} \right|$$

Herein, d may represent a difficulty level of the game. $\vec{P}_{i1}$ and $\vec{P}_{i2}$ may respectively represent expected pixel coordinates of the item on the display at two consecutive moments or pixel coordinates of expected positions of two items on the display at a same moment in a game scenario in which the user is indicated to complete a somatosensory action corresponding to a difficulty coefficient $c_i$. Herein, i is a positive integer greater than or equal to 1 and less than or equal to q. For a coordinate system in which the foregoing pixel coordinate is located, refer to the coordinate system shown in FIG. 1C. $\vec{A}^T = [A_x, A_y]^T$ may be a weight vector. $A_x$ may be a weight occupied when displacement in an x-axis direction (for example, a horizontal direction) is used to measure the difficulty level. $A_y$ may be a weight occupied when displacement in a y-axis direction (for example, a vertical direction) is used to measure the difficulty level. $\Delta t_i$ may represent a time period occupied by performing the somatosensory action corresponding to the difficulty coefficient $c_i$.

Items the foregoing game scenarios in which the user is indicated to complete different types of somatosensory actions may be the same or different. This is not limited in this embodiment of this application, and may be determined based on different games.

In a process of a game at a specific stage, a somatosensory action that the user is indicated to complete in a game scenario includes a plurality of different types of somatosensory actions. In a game scenario in which the user is indicated to complete each somatosensory action, pixel coordinates of the item on the display is adjusted based on a difficulty level of a game. Specifically, the electronic device 100 may determine, by using a dynamic programming algorithm, a type of a somatosensory action that matches a game difficulty level of a game at one stage in a game process of this stage, and pixel coordinates of the item on the display in a game scenario in which the user is indicated to complete the corresponding somatosensory action. The foregoing dynamic programming algorithm may be, for example, a Viterbi algorithm, a greedy algorithm, or the like. A specific implementation of the foregoing dynamic programming algorithm is not limited in this embodiment of this application. For details, refer to a method for implementing the dynamic programming algorithm in the conventional technology.

In the foregoing method for adjusting the type of the somatosensory action, the electronic device 100 may adjust, based on the actual heart rate of the user in the game process, the type of the somatosensory action that the user is indicated to complete in the game scenario, to adjust the exercise load of the somatosensory action that the user is indicated to perform in the game scenario of the game at each stage. In this way, an exercise load of a somatosensory action that the user is indicated to perform in an adjusted game scenario matches the exercise capability of the user. This can better help the user achieve the expected exercise effect.

In some embodiments, when adjusting the exercise load of the somatosensory action that the user is indicated to perform in the game scenario of the game at each stage, the electronic device 100 may adjust a plurality of a motion amplitude, a quantity of times of completing the same somatosensory action within the same time length, and the type of the somatosensory action. In this embodiment of this application, a specific manner of adjusting the exercise load of the somatosensory action that the user is indicated to perform in the game scenario of the game at each stage is not limited.

FIG. 3 is an example of a flowchart of a somatosensory interaction method. As shown in FIG. 3, the somatosensory interaction method may include steps S101 to S105.

S101: An electronic device 100 determines a game difficulty model. The game difficulty model may include an expected difficulty level of a game at each stage and an expected heart rate of a user in the game at each stage.

A plurality of different game modes may be stored in the electronic device 100. Different game modes may include different game scenarios, so that the user is indicated to complete somatosensory actions of different exercise loads to achieve different exercise effects.

Before starting to play a game, the electronic device 100 may receive a user operation for selecting a game mode. When determining the game mode selected by the user, the electronic device 100 may determine a game difficulty model corresponding to the game mode. The game mode may include games at a plurality of stages. That the electronic device 100 determines a game difficulty model may be specifically: determining the expected difficulty level of the game at each stage and the expected heart rate of the user in the game at each stage in the game mode. For example, a first game mode may include games at n stages. Expected difficulty levels of games at a first stage to an nth stage may be $d_{t1}$, $d_{t2}$, . . . , and $d_{tn}$, respectively. Expected heart rates of the user in the games at the first stage 1 to the nth stage may be $h_{t1}$, $h_{t2}$, . . . , and $h_{tn}$, respectively. The foregoing expected heart rate is not limited to a value, and may alternatively be a value range. For example, when an actual heart rate reached when the user completes the game at the first stage falls within a range represented by the expected heart rate $h_{t1}$ in the game at the first game, the electronic device 100 may determine that the user achieves an expected exercise effect of the game at the first stage.

The expected difficulty level and the expected heart rate may be determined based on sports knowledge in the conventional technology. Specific methods for determining the expected difficulty level of and the expected heart rate in the game at each stage are not limited in this embodiment of this application.

S102: The electronic device 100 obtains figure data of the user. The figure data may include a weight, a height, a shoulder height, and an arm length.

In a possible implementation, the electronic device 100 may store user information. The user information may include the figure data of the user.

The user information may be obtained by requesting, by the electronic device 100 before starting to play a game, the user to enter the user information. For example, before starting to play the game for the first time, the electronic device 100 may display a user information entry interface on a display. The user information entry interface may be used to indicate the user to enter the user information. The user information may include a user name, an age, a gender, the height, the weight, the shoulder height, the arm length, and the like. Content included in the foregoing user information is not limited in this embodiment of this application.

In a possible implementation, the electronic device 100 may obtain the figure data of the user through calculation by using an image collected by a camera 193. The height, the shoulder height, and the arm length in the figure data may respectively be an actual height, an actual shoulder height, and an actual arm length of the user, or may respectively be pixel lengths of the height, the shoulder height, and the arm length in the image collected by the camera 193.

In a possible implementation, the electronic device 100 may obtain the figure data of the user from a cloud or another device. For example, a first account may be logged in on the electronic device 100. The foregoing user information is stored in the cloud or the another device on which the first account is logged in. In this case, the electronic device 100 may establish a communication connection to the cloud or the another device on which the first account is logged in, to obtain the figure data of the user.

A method for obtaining the figure data of the user by the electronic device 100 is not limited in this embodiment of this application.

S103: The electronic device 100 generates a game scenario based on the figure data of the user and the game difficulty model.

When the game difficulty model and the figure data of the user are determined, the electronic device 100 may generate a game scenario of the game at each stage. In the game scenario of the game at each stage, the user may be indicated to complete a somatosensory action required in the game scenario of the game at each stage. That is, a process of generating the game scenario of the game at each stage may be a process of determining an exercise load of the somatosensory action that the user is indicated to perform in the game scenario of the game at each stage.

In a possible implementation, the electronic device 100 may generate only game scenarios of games at the first k stages. Herein, k is a positive integer less than n. In a process of playing a game, the electronic device 100 may adjust, based on an actual heart rate of the user, a difficulty level of the game and an exercise load of a somatosensory action that the user is indicated to perform in a game scenario. In this case, the electronic device 100 first generates the game scenarios of the games at the first k stages, so that computing resources of the electronic device 100 can be saved.

For a method in which the electronic device 100 generates the game scenario based on the figure data of the user and the game difficulty model, refer to the descriptions in the foregoing embodiment in which the electronic device 100 determines, based on the figure data of the user, the exercise load of the somatosensory action that the user is indicated to perform in the game scenario. Details are not described herein again.

Users of different figures perceive different difficulty on a same somatosensory action, and the electronic device 100 generates the game scenario with reference to the figure data of the user. Therefore, different users can perceive same or similar difficulty on somatosensory actions that the users are indicated to perform in game scenarios of games with a same difficulty level. This helps different users achieve expected exercise effects.

S104: The electronic device 100 obtains an actual heart rate of the user in a game at a current stage.

In a possible implementation, the user may wear the heart rate detection apparatus shown in FIG. 2A. The electronic device 100 may establish a communication connection to the heart rate detection apparatus, and obtain, from the heart rate detection apparatus, an actual heart rate of the user in a game process.

Specifically, an example in which a game at a first stage is currently played is used for description. The electronic device 100 may obtain a heart rate at an entire stage from the start to the end of the game at the first stage from the heart rate detection apparatus, and calculate an average heart rate at which the user plays the game at the first stage. Alternatively, the electronic device 100 may obtain, from the heart rate detection apparatus, a heart rate within a preset time period (for example, within one minute) in which the game at the first stage is about to end.

In a possible implementation, the electronic device 100 may include a heart rate detection apparatus. The electronic device 100 may obtain the actual heart rate of the user by using a non-contact heart rate detection method. For example, the heart rate detection apparatus in the electronic device 100 may include the camera 193. In the game process, the camera 193 may collect the image of the user. The electronic device 100 may determine facial information of the user from the image of the user by using a face recognition technology, and extract a photoplethysmography signal of the user from the facial information. Further, the electronic device 100 may obtain the actual heart rate of the user in the game at the current stage through calculation based on the photoelectric volume pulse wave signal. For a specific implementation process in which the electronic device 100 obtains the actual heart rate of the user by using the non-contact heart rate detection method, refer to an implementation process in the conventional technology. Details are not described herein.

A method in which the electronic device 100 obtains the actual heart rate in the game at the current stage is not limited in this embodiment of this application.

S105: The electronic device 100 adjusts a difficulty level and a game scenario of a game at a next stage in the game difficulty model based on the actual heart rate and an expected heart rate of the user in the game at the current stage.

The electronic device 100 may determine, by comparing the actual heart rate and the expected heart rate of the user in the game at the current stage, whether the user achieves an expected exercise effect of the game at the current stage. For a method in which the electronic device 100 adjusts the difficulty level and the game scenario of the game at the next stage in the game difficulty model, refer to the descriptions of an implementation in the foregoing embodiment in which the electronic device 100 adjusts, based on the actual heart rate of the user, the exercise load of the somatosensory action that the user is indicated to perform in the game scenario. Details are not described herein.

When determining the difficulty level and the game scenario of the game at the next stage, the electronic device 100 may display a game interface of the game at the next stage. In this way, the user may complete the somatosensory action that the user is indicated to complete in the game scenario of the game at the next stage. When the game at the next stage is entered, the game at the next stage is a game currently played by the user. The electronic device 100 may perform step S104, to obtain an actual heart rate of the user in the game at this stage. Further, the electronic device 100 may adjust a difficulty level and a game scenario of a game at a subsequent stage in the game difficulty model based on the actual heart rate and an expected heart rate of the user of the game at this stage.

It may be learned from the somatosensory interaction method shown in FIG. 3 that, the electronic device may determine, based on a figure of a user who actually plays a game, exercise loads of somatosensory actions that the user is indicated to perform in game scenarios of games with a same difficulty level. Users of different figures perceive same or similar difficulty when playing a game at a same stage. This is beneficial to the users of different figures to achieve an expected exercise effect when playing the game at the same stage. In addition, the electronic device may further dynamically adjust, in combination with a real-time heart rate, the exercise load of the somatosensory action that the user is indicated to perform in the game scenario of the game at each stage. A change of the heart rate of the user during the game can reflect an exercise capability of the user. An exercise load obtained by adjusting based on the real-time heart rate may match the exercise capability of the user. This better helps the user achieve the expected exercise effect, and avoid an exercise risk generated when the user plays an excessively difficult game.

Figure 4:
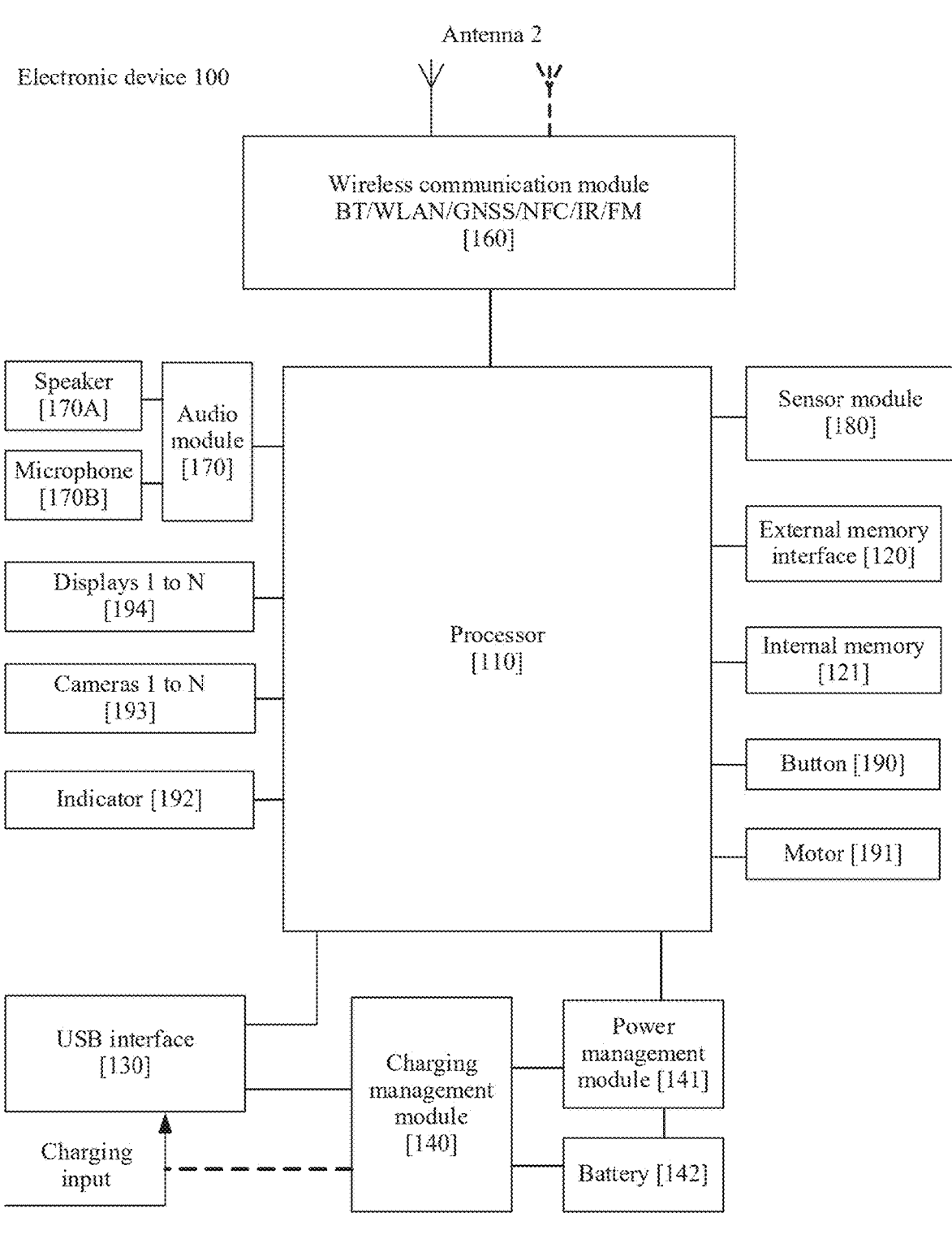
FIG. 4 is a schematic diagram of a structure of an electronic device according to an embodiment of this application.

FIG. 4 is an example of a schematic diagram of a structure of an electronic device 100.

The electronic device 100 may include a processor no, an external memory interface 120, an internal memory 121, a universal serial bus (universal serial bus, USB) interface 130, a charging management module 140, a power management module 141, a battery 142, an antenna 2, a wireless communication module 160, an audio module 170, a speaker 170A, a microphone 170B, a sensor module 180, a button 190, a motor 191, an indicator 192, a camera 193, a display 194, and the like.

It may be understood that the structure shown in this embodiment of the present invention does not constitute a specific limitation on the electronic device 100. In other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), and/or a neural-network processing unit (neural-network processing unit, NPU). Different processing units may be separate devices, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor no, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instructions or the data from the memory. This avoids repeated access and reduces waiting time of the processor 110, so that system efficiency is improved.

The USB interface 130 is an interface that conforms to a USB standard specification, and may be specifically a mini USB interface, a micro USB interface, a USB T e-C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may be further configured to connect to another electronic device such as an AR device.

The charging management module 140 is configured to receive a charging input from a charger. The charger may be a wireless charger or a wired charger. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communication module 160, and the like.

A wireless communication function of the electronic device 100 may be implemented through the antenna 2, the wireless communication module 160, the modem processor, and the like.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100.

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect an external storage card. The external storage card communicates with the processor 110 through the external memory interface 120, to implement a data storage function. For example, files such as music and a video are stored in the external storage card.

The internal memory 121 may be configured to store computer executable program code. The executable program code includes instructions. The processor 110 runs the instructions stored in the internal memory 121, to perform various function applications of the electronic device 100 and data processing.

The electronic device 100 may implement an audio function, for example, music playing and recording, through the audio module 170, the speaker 170A, the microphone 170B, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor no, or some functional modules in the audio module 170 are disposed in the processor no.

The speaker 170A, also referred to as a "horn", is configured to convert an electrical audio signal into a sound signal. The electronic device 100 may be configured to listen to music or answer a call by using the speaker 170A.

The microphone 170B, also referred to as a "mic" or a "mike", is configured to convert a sound signal into an electrical signal. At least one microphone 170B may be disposed in the electronic device 100. In some other embodiments, two microphones 170B may be disposed in the electronic device 100, to collect a sound signal and implement a noise reduction function. In some other embodiments, three, four, or more microphones 170B may alternatively be disposed in the electronic device 100, to collect a sound signal, implement noise reduction, and identify a sound source, so as to implement a directional recording function and the like.

The sensor module 180 may include a distance sensor, a fingerprint sensor, a temperature sensor, a touch sensor, and the like.

The distance sensor may be configured to measure a distance. The electronic device 100 may measure the distance in an infrared manner or a laser manner. In some embodiments, in a photographing scenario, the electronic device 100 may measure a distance by using the distance sensor to implement quick focusing.

The fingerprint sensor may be configured to collect a fingerprint. The electronic device 100 may use a feature of the collected fingerprint to implement fingerprint-based unlocking.

The temperature sensor may be configured to detect a temperature. In some embodiments, the electronic device 100 executes a temperature processing policy by using the temperature detected by the temperature sensor. For example, when the temperature reported by the temperature sensor exceeds a threshold, the electronic device 100 degrades performance of a processor near the temperature sensor, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor is also referred to as a "touch panel". The touch sensor may be disposed on the display 194, and the touch sensor K and the display 194 form a touchscreen, which is also referred to as a "touch screen". The touch sensor is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor may alternatively be disposed on a surface of the electronic device 100, and is at a position different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The indicator 192 may be an indicator light, and may be configured to indicate a charging status and a power change, or may be configured to indicate a message, a notification, and the like.

Not limited to the components shown in FIG. 4, the electronic device 100 may include more or fewer components. The electronic device 100 in this embodiment of this application may be another type of electronic device, for example, a television, a mobile phone, a tablet computer, a notebook computer, an ultra-mobile personal computer (ultra-mobile personal computer, UMPC), a handheld computer, a netbook, or a personal digital assistant (personal digital assistant, PDA), a portable multimedia player (portable multimedia player, PMP), a dedicated media player, or an AR (augmented reality)/VR (virtual reality) device. A specific type of the electronic device 100 is not limited in embodiments of this application.

In a game process, the electronic device 100 may further determine, based on an actual heart rate percentage of a user, whether an exercise load of a somatosensory action that the user is indicated to perform in a game scenario of a game at a current stage is appropriate, and adaptively adjust a difficulty level of a game at a next stage and an exercise load of a somatosensory action that the user is indicated to perform in a game scenario of the game at the next stage.

In the somatosensory interaction method shown in FIG. 3, whether the user achieves an expected exercise effect may be determined by comparing an actual heart rate and an expected heart rate of the user in the game process. Because maximum heart rates that can be reached by users of different ages are different, exercise loads required by the users of different ages to achieve a same expected heart rate are usually different, and exercise effects achieved by the users of different ages are also different. For example, an expected heart rate in a game at a specific stage is 150 times/minute. An exercise load required by a user aged 20 to reach the expected heart rate is usually higher than an exercise load required by a user aged 50 to reach the expected heart rate.

The heart rate percentage may represent a proportional relationship between a current heart rate of the user and a maximum heart rate that can be reached by the user. A higher the heart rate percentage indicates that the current heart rate of the user is closer to the maximum heart rate.

In a possible implementation, the heart rate percentage may be a ratio of the current heart rate of the user to the maximum heart rate of the user, that is, HR %=h/HR max. Herein, HR % may represent the heart rate percentage, h may represent the current heart rate of the user, and $HR_{max}$ may represent the maximum heart rate of the user. $HR_{max}$=220-age. A method for calculating the maximum heart rate of the user is not limited in this embodiment of this application.

Optionally, the heart rate percentage may be a ratio of a difference between the current heart rate of the user and a resting heart rate of the user to a difference between the maximum heart rate of the user and the resting heart rate of the user, that is, HR %=(h−HRrest)/(HRmax−HRrest). Herein, HRrest may represent the resting heart rate of the user.

A specific calculation manner of the heart rate percentage is not limited in this embodiment of this application.

Usually, exercise effects achieved by different users when reaching a same heart rate percentage are the same or similar.

An example in which the heart rate percentage is the ratio of the current heart rate of the user to the maximum heart rate of the user is used for description. An expected heart rate percentage of the user that is reached when completing a game at a specific stage is 70%. In this case, a heart rate of the user aged 20 reached when reaching the expected heart rate percentage is 140 times/minute. A heart rate of the user aged 50 reached when reaching the expected heart rate percentage is 119 times/minute. It may be seen that, compared with the heart rate, the heart rate percentage can better measure whether different users achieve expected exercise effects.

The following describes in detail an implementation in which the electronic device 100 adjusts, based on the actual heart rate percentage of the user, an exercise load of a somatosensory action that the user is indicated to perform in a game scenario.

Figure 5:
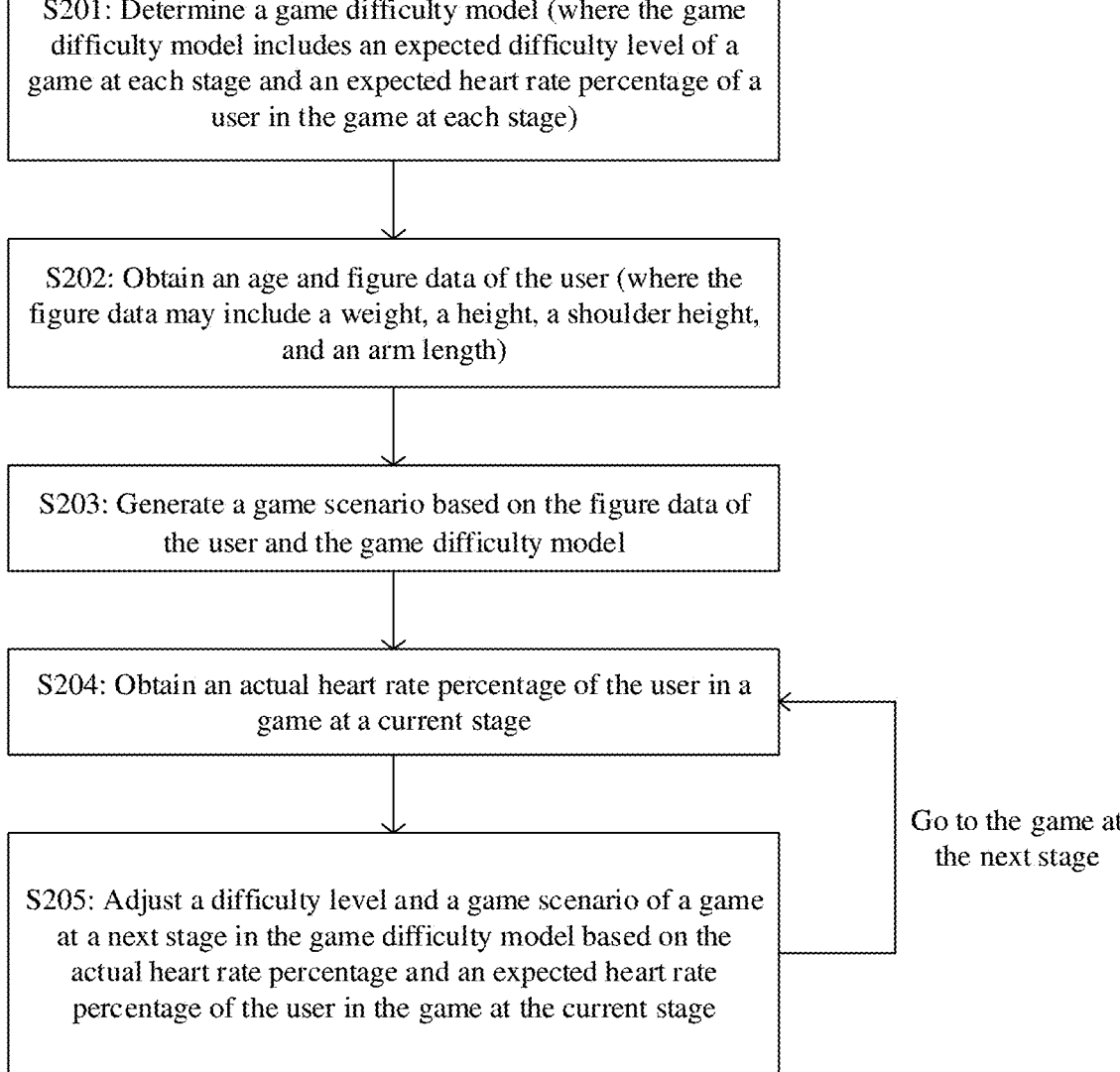
FIG. 5 is a flowchart of another somatosensory interaction method according to an embodiment of this application.

FIG. 5 is an example of a flowchart of another somatosensory interaction method. As shown in FIG. 5, the method may include steps S201 to S205.

S201: An electronic device 100 determines a game difficulty model. The game difficulty model may include an expected difficulty level of a game at each stage and an expected heart rate percentage of a user in the game at each stage.

For a method for determining the game difficulty model by the electronic device 100, refer to step S101 in the method shown in FIG. 3.

Different from step S101, in this step, the electronic device 100 may determine the expected heart rate percentage of the user in the game at each stage. For example, a first game mode may include games at n stages. Expected difficulty levels of games at the first stage 1 to the $n^{th}$ stage may be $d_{t1}$, $d_{t2}$, . . . , and $d_{tm}$, respectively. Expected heart rate percentages of the user in the games at the first stage 1 to the $n^{th}$ stage may be HR $\%_{t1}$, HR $\%_{t2}$, . . . , and HR $\%_{tm}$, respectively. The foregoing expected heart rate percentage is not limited to a value, and may alternatively be a value range. For example, when an actual heart rate percentage reached when the user completes the game at the first stage falls within a range represented by the expected heart rate percentage HR $\%_{t1}$ in the game at the first game, the electronic device 100 may determine that the user achieves an expected exercise effect of the game at the first stage.

The expected heart rate percentage may be determined based on sports knowledge in the conventional technology. A specific method for determining the expected heart rate percentage is not limited in this embodiment of this application.

S202: The electronic device 100 obtains an age and figure data of the user. The figure data of may include a weight, a height, a shoulder height, and an arm length.

S203: The electronic device 100 generates a game scenario based on the figure data of the user and the game difficulty model.

For step S202 and step S203, refer to step S102 and step S103 in the foregoing embodiment respectively. Details are not described herein again.

S204: The electronic device 100 obtains an actual heart rate percentage of the user in a game at a current stage.

In a possible implementation, the user may wear the heart rate detection apparatus shown in FIG. 2A. The electronic device 100 may obtain, from the heart rate detection apparatus, an actual heart rate percentage of the user in a game process. Alternatively, the electronic device 100 may obtain, from the heart rate detection apparatus, an actual heart rate of the user in a game process. Further, the electronic device 100 may obtain an actual heart rate percentage through calculation based on the age and the actual heart rate of the user.

In a possible implementation, the electronic device 100 may include a heart rate detection apparatus. The electronic device 100 may obtain an actual heart rate of the user by using a non-contact heart rate detection method. Then, the electronic device 100 may obtain an actual heart rate percentage through calculation based on the age and the actual heart rate of the user.

A method in which the electronic device 100 obtains the actual heart rate percentage of the user in the game at the current stage is not limited in this embodiment of this application.

S205: The electronic device 100 adjusts a difficulty level and a game scenario of a game at a next stage in the game difficulty model based on the actual heart rate percentage and an expected heart rate percentage of the user in the game at the current stage.

In the game at the current stage, if the actual heart rate percentage is lower than the expected heart rate percentage, for example, a value of obtained by subtracting the actual heart rate percentage from the expected heart rate percentage is higher than a4, or the actual heart rate percentage is lower than b4 times of the expected heart rate percentage, the electronic device 100 may determine that the user does not achieve an expected exercise effect in the game at the current stage. The electronic device 100 may increase the difficulty level of the game at the next stage and increase an exercise load of a somatosensory action that the user is indicated to perform in the game scenario. Herein, a4 and b4 may be preset thresholds. Values of both a4 and b4 may be positive numbers less than 1. The specific values of a4 and b4 are not limited in this embodiment of this application.

In the game at the current stage, if the actual heart rate percentage is higher than the expected heart rate percentage, for example, a value of obtained by subtracting the expected heart rate percentage from the actual heart rate percentage is higher than a5, or the actual heart rate percentage is higher than b5 times of the expected heart rate percentage, the electronic device 100 may determine that an exercise effect achieved by the user exceeds an expected exercise effect in the game at the current stage. The electronic device 100 may decrease the difficulty level of the game at the next stage and decrease an exercise load of a somatosensory action that the user is indicated to perform in the game scenario. Herein, a5 and b5 may be preset thresholds. Values of both a5 and b5 may be positive numbers less than 1. The specific values of a5 and b5 are not limited in this embodiment of this application.

For a method in which the electronic device 100 adjusts the difficulty level and the game scenario of the game at the next stage in the game difficulty model, refer to the descriptions of an implementation in the foregoing embodiment in which the electronic device 100 adjusts, based on the actual heart rate of the user in the game at the current stage, the exercise load of the somatosensory action that the user is indicated to perform in the game scenario. Details are not described herein again.

In the game at the current stage, if the actual heart rate percentage is equal to the expected heart rate percentage, or a difference between the actual heart rate percentage and the expected heart rate percentage is less than a6, the electronic device 100 may determine that an exercise effect achieved by the user is the same as or close to an expected exercise effect in the game at the current stage. The electronic device 100 may indicate the user to exercise based on an expected difficulty level of the game at the next stage. Herein, a6 may be a preset threshold. A value of a6 may be a positive number less than 1. A specific value of a6 is not limited in this embodiment of this application.

It may be learned from the somatosensory interaction method shown in FIG. 5 that, the electronic device may determine, based on a figure of a user who actually plays a game, exercise loads of somatosensory actions that the user is indicated to perform in game scenarios of games with a same difficulty level, and dynamically adjust the exercise load based on a heart rate percentage of the user in a game process. Compared with the heart rate, the heart rate percentage may reflect a degree of proximity between the current heart rate of the user and the maximum heart rate that can be reached by the user, and better measure the exercise effect achieved by the user in the game process. In this case, an exercise load obtained by adjusting based on a real-time heart rate percentage may better match an exercise capability of the user. This better helps the user achieve the expected exercise effect, and avoid an exercise risk generated when the user plays an excessively difficult game.

In the game process, the electronic device 100 may further adjust, based on a heart rate response rate, the difficulty level of the game and the exercise load of the somatosensory action that the user is indicated to perform in the game scenario.

The heart rate response rate may reflect a rate at which a heart rate of the user increases or decreases or a rate at which the heart rate percentage increases or decreases within a specific time period, that is, $r=\Delta h/t$, or $r=\Delta HR \%/t$. Herein, $r=\Delta HR \%/t$ may represent the heart rate response rate, t may represent a time length, $\Delta h$ may represent a difference, within a time length t, obtained by subtracting a heart rate of the user at the beginning of the time period from a heart rate of the user at the end of the time period, and $\Delta HR \%$ may represent a difference, within the time length t, obtained by subtracting a heart rate percentage of the user at the beginning of the time period from a heart rate percentage of the user at the end of the time period. The heart rate response rate may include an increasing response rate and a decreasing response rate. The increasing response rate may represent a rate at which the heart rate or the heart rate percentage increases in a specific time period. The decreasing response rate may represent a rate at which the heart rate or the heart rate percentage decreases in a specific time period. When a value obtained according to the foregoing calculation formula of the heart rate response rate is a positive number, the heart rate response rate is an increasing response rate. When a value obtained according to the foregoing calculation formula of the heart rate response rate is a negative number, the heart rate response rate is a decrease response rate.

It may be understood that, when determining a heart rate (or a heart rate percentage) of the user that is reached at the beginning of a game at a specific stage and an expected heart rate (or an expected heart rate percentage) of the user that is reached when the game at this stage is completed, the electronic device 100 may calculate an expected heart rate response rate of the user in the game at this stage. The electronic device 100 may more accurately adjust, based on the expected heart rate response rate, a difficulty level of the game and an exercise load of a somatosensory action that the user is indicated to perform in a game scenario. In this way, an adjusted exercise load can better help the user achieve an expected exercise effect.

The following describes in detail an implementation in which the electronic device 100 adjusts, based on the heart rate response rate of the user, an exercise load of a somatosensory action that the user is indicated to perform in a game scenario.

FIG. 6 is an example of a flowchart of another somatosensory interaction method. As shown in FIG. 6, the method may include steps S301 to S305.

S301: An electronic device 100 determines a game difficulty model. The game difficulty model may include an expected difficulty level of a game at each stage and an expected heart rate of a user in the game at each stage.

S302: The electronic device 100 may obtain figure data of the user. The figure data may include a weight, a height, a shoulder height, and an arm length.

S303: The electronic device 100 may generate a game scenario based on the figure data of the user and the game difficulty model.

For step S301 to step S303, refer to step S101 to step S103 shown in FIG. 3. Details are not described herein again.

S304: The electronic device 100 may obtain an initial heart rate of the user at the beginning of a game at a current stage.

In a possible implementation, the electronic device 100 may use a heart rate of the user at the end of a game at a previous stage of the game at the current stage as the initial heart rate at the beginning of the game at the current stage.

In another possible implementation, the electronic device 100 may obtain a heart rate of the user within a preset time period before or after the beginning of the game at the current stage, and use the heart rate as the initial heart rate at the beginning of the game at the current stage.

S305: The electronic device 100 calculates an expected heart rate response rate based on the initial heart rate and an expected heart rate of the user in the game at the current stage, and adjusts a difficulty level and a game scenario of the game at the current stage in the game difficulty model based on the expected heart rate response rate.

The electronic device 100 may calculate the expected heart rate response rate of the user in the game at the current stage according to a calculation formula $r=\Delta h/t$ of the heart rate response rate, where expected heart rate response rate= (expected heart rate-initial heart rate)/time length occupied by the game at the current stage.

In a possible implementation, the electronic device 100 may query a heart rate response rate data table to adjust the difficulty level of the game at the current stage.

The electronic device 100 may store the heart rate response rate data table. The heart rate response rate data table may be used to record a relationship between the difficulty level and the expected heart rate response rate of the game. The following Table 1 shows an example of specific content included in the heart rate response rate data table.

TABLE 1

| Difficulty level d | Initial heart rate $h_{ini}$ (times/minute) | Expected increasing response rate $r_1$ | Expected decreasing response rate $r_2$ |
|---|---|---|---|
| 1 | 80 | 20/t | −5/t |
| 1 | 100 | 10/t | −10/t |
| 1 | 120 | 5/t | −20/t |
| 2 | 80 | 30/t | −10/t |
| 2 | 100 | 20/t | −20/t |
| 2 | 120 | 10/t | −30/t |
| 3 | 80 | 40/t | −20/t |
| 3 | 100 | 30/t | −30/t |
| 3 | 120 | 20/t | −40/t |

Herein, tin Table 1 may represent the time length occupied by the game at the current stage.

It may be learned from Table 1 that, when the initial heart rate of the user in the game at the current stage and the expected heart rate response rate of the user in the game at the current stage are determined, the electronic device 100 may query the heart rate response rate data table to determine the difficulty level of the game at the current stage. For example, when a game at a specific stage starts to play, an initial heart rate of the user is 80 times/minute, and the expected heart rate response rate is 30/t. The electronic device 100 may determine, based on the heart rate response rate data table, that a difficulty level of the game at this stage is 2. Further, the electronic device 100 may adjust a game scenario of the game at this stage according to the method in the foregoing embodiment, so that an exercise load of a somatosensory action that the user is indicated to perform in the game scenario of the game at this stage can help the user achieve an expected exercise effect.

Specific values included in Table 1 are not limited in this embodiment of this application.

A correspondence among the difficulty level, the initial heart rate, and the heart rate response rate in the heart rate response rate data table may be obtained based on big data statistics. In addition, the electronic device 100 may update the heart rate response rate data table based on a relationship among the difficulty level of the game, the initial heart rate of the user, and the actual heart rate response rate of the user in a process in which the user actually plays the game. An exercise capability of the user may increase with increases of a quantity of exercise times and an exercise time period of the user. The electronic device 100 adjusts the data in the heart rate response rate data table based on the actual heart rate response rate of the user, so that the heart rate response rate data table better matches the exercise capability of the user. In this way, the difficulty level and the game scenario determined based on the heart rate response rate data table can better help the user achieve the expected exercise effect.

In another possible implementation, the electronic device 100 may adjust the difficulty level of the game at the current stage based on a function relationship between the heart rate response rate and the difficulty level of the game.

The electronic device 100 may store a function relational expression between the expected heart rate response rate and the difficulty level and a function relational expression between the expected heart rate response rate and the initial heart rate. Herein, the expected increasing response rate is $r_1=w_1(d, h_{ini})$, the expected decreasing response rate is $r_2=w_2(d, h_{ini})$, $q_1=(d, h_{ini})$, represents a function relational expression for calculating the increasing response rate with the difficulty level d and the initial heart rate $h_{ini}$ as parameters, and $w_2(d, h_{ini})$ represents a function relational expression for calculating the increasing response rate with the difficulty level d and the initial heart rate $h_{ini}$ as parameters, and That is, when the heart rate response rate is the increasing response rate, the difficulty level $d=w'_1(r_1, h_{ini})$. When the heart rate response rate is the decreasing response rate, the difficulty level $d=w'_2(r_2, h_{ini})$.

After determining the initial heart rate of the user in the game at the current stage and the expected heart rate response rate of the user in the game at the current stage, the electronic device 100 may determine the difficulty level of the game at the current stage according to the foregoing function relational expression. Further, the electronic device 100 may adjust the game scenario at this stage.

The foregoing function relational expression may be obtained by the electronic device 100 through fitting based on the foregoing heart rate response rate data table. A specific expression of the function relational expression between the expected heart rate response rate and the difficulty level and a specific expression of the function relational expression between the expected heart rate response rate and the initial heart rate are not limited in this embodiment of this application.

When the difficulty level and the game scenario of the game at the current stage are determined, the electronic device 100 may display the corresponding game scenario on a display to indicate the user to exercise. After the game at the current stage is completed, the electronic device 100 may determine a difficulty level and a game scenario of a game at next stage according to the methods in step S304 and step S305.

It should be noted that the heart rate in the steps shown in FIG. 6 may be a heart rate percentage. To be specific, the electronic device 100 may adjust the difficulty level and the game scenario of the game based on an increase rate or a decrease rate of an expected heart rate percentage of the user.

It may be learned from the somatosensory interaction method shown in FIG. 6 that, the electronic device 100 may calculate an expected heart rate response rate based on an initial heart rate and an expected heart rate of a user in a game at a specific stage, and adjust a difficulty level and a game scenario of the game at this stage based on the expected heart rate response rate. After completing a somatosensory action indicated in an adjusted game scenario, a heart rate (or a heart rate percentage) reached by the user may be better close to the expected heart rate (or an expected heart rate percentage) of the user in the game at this stage. In this way, the user can better achieve an expected exercise effect of the game at this stage.

In some embodiments, the electronic device 100 may further measure a difficulty level of a game at each stage based on expected displacement of each body part of the user in an exercise process. It may be understood that, when some somatosensory actions are performed, only some body parts of the user move. For example, a chest expansion exercise requires only arms of the user to move. A forward kick or a backward kick requires only legs of the user to move. Compared with measuring the difficulty level of the game based on expected overall displacement of a body of the user, measuring the difficulty level of the game based on the expected displacement of each body part may be more accurately. A magnitude of the expected displacement of each body part may be determined based on pixel displacement of an item displayed on the display in the game scenario.

Specifically, the body pails of the user may be divided into 10 pails: a head and neck part, a torso, a left upper arm, a right upper arm, a left forearm, a right forearm, a left thigh, a right thigh, a left leg, and a right leg. In this case, a difficulty level of a game at a specific stage may be obtained by multiplying expected displacement of the body pails and a sum of weights corresponding to the body parts in a process of the game at this stage. For a calculation formula of a difficulty level of a game at a specific stage, refer to the following formula (7):

$$d=s_1*l_1+s_2*l_2+\ldots+s_i*l_i+\ldots+s_{10}*l_{10} \quad (7)$$

Herein, i is an integer greater than or equal to 1 and less than or equal to 10, $l_1$, $l_2$, $l_3$, $l_4$, $l_5$, $l_6$, $l_7$, $l_8$, $l_9$, and $l_{10}$ may represent the expected displacement of the head and neck part, the torso, the left upper arm, the right upper arm, the left forearm, the right forearm, the left thigh, the right thigh, the left leg, and the right leg, respectively, and $s_1$, $s_2$, $s_3$, $s_4$, $s_5$, $s_6$, $s_7$, $s_8$, $s_9$, and $s_{10}$ may represent the weights corresponding to the head and neck part, the torso, the left upper arm, the right upper arm, the left forearm, the right forearm, the left thigh, the right thigh, the left leg, and the right leg, respectively.

In a possible implementation, the weight corresponding to each body part may be determined based on a mass percentage of each body part in a human body weight. According to a general standard of human body weight distribution, for a value of the weight corresponding to each body part, refer to Table 2.

TABLE 2

| Body part name | Male weight (%) | Female weight (%) |
|---|---|---|
| Head and neck part | 8.6 | 8.2 |
| Torso | 44 | 43.8 |
| Left upper arm | 2.4 | 2.8 |
| Right upper arm | 2.4 | 2.8 |
| Left forearm | 1.9 | 1.5 |
| Right forearm | 1.9 | 1.5 |
| Left thigh | 14.2 | 14.1 |
| Right thigh | 14.2 | 14.1 |
| Left leg | 5.2 | 5.6 |
| Right leg | 5.2 | 5.6 |

A division manner of the body parts of the user and the weight corresponding to each body part are not limited in this embodiment of this application.

When the difficulty level of the game at each stage is determined, the electronic device 100 may adjust a game scenario of the game at each stage according to the method in the foregoing embodiment. Details are not described herein again.

It may be learned from the foregoing method that, when some somatosensory actions are performed, only some body parts of the user generate displacements. When some body parts of the user generate displacement when somatosensory actions that the user is indicated to complete in the game scenario are performed, a large error may occur when the difficulty level of the game is measured based on the expected overall displacement of the body of the user. The difficulty level can be more accurately determined through division of the body parts of the user and measurement of the difficulty level of the game based on the expected displacement of each body part. In this way, the electronic device 100 can more accurately adjust an exercise load of a somatosensory action that the user is indicated to perform in the game scenario of the game at each stage, to better help the user achieve an expected exercise effect.

In some embodiments, the electronic device 100 may determine whether a heart rate of the user reaches or exceeds a maximum heart rate that can be reached by the user. When determining that the heart rate of the user reaches or exceeds the maximum heart rate that can be reached by the user, the electronic device 100 may stop the game or decrease the difficulty level of the game at the next stage. In this way, exercise risks such as syncope and sudden death caused by excessive exercise intensity can be avoided.

Alternatively, the electronic device 100 may obtain actual displacement of the user in the game process, and calculate, according to the foregoing formula (3) or formula (7), a difficulty level that is actually reached when the user plays the game. If it is determined that the actually reached difficulty level continuously increases, but the heart rate of the user does not increase anymore or an increase amplitude of the heart rate is less than a preset threshold, the electronic device 100 may stop the game or decrease the difficulty level of the game at the next stage. Continuous increasing of the difficulty level that is actually reached by the user may represent that actual exercise intensity of the user continuously increases. When the actual exercise intensity continuously increases but the heart rate barely increases, the heart rate of the user may be close to the maximum heart rate that can be reached by the user. To avoid an exercise risk of the user, the electronic device 100 may stop the game or decrease the difficulty level of the game at the next stage.

When determining a decreased difficulty level of the game, the electronic device 100 may adjust the game scenario according to the method in the foregoing embodiment, to decrease the exercise load.

In some embodiments, the electronic device 100 may detect information about a site, and determine an unreachable position in the site of the game. When determining the game scenario, the electronic device 100 may prevent a somatosensory motion that the user is indicated to complete in the game scenario from reaching or passing through the foregoing unreachable position. The foregoing unreachable position may include a position at which an obstacle (for example, a table, a chair, a wall, and the like) exists.

Figure 7:
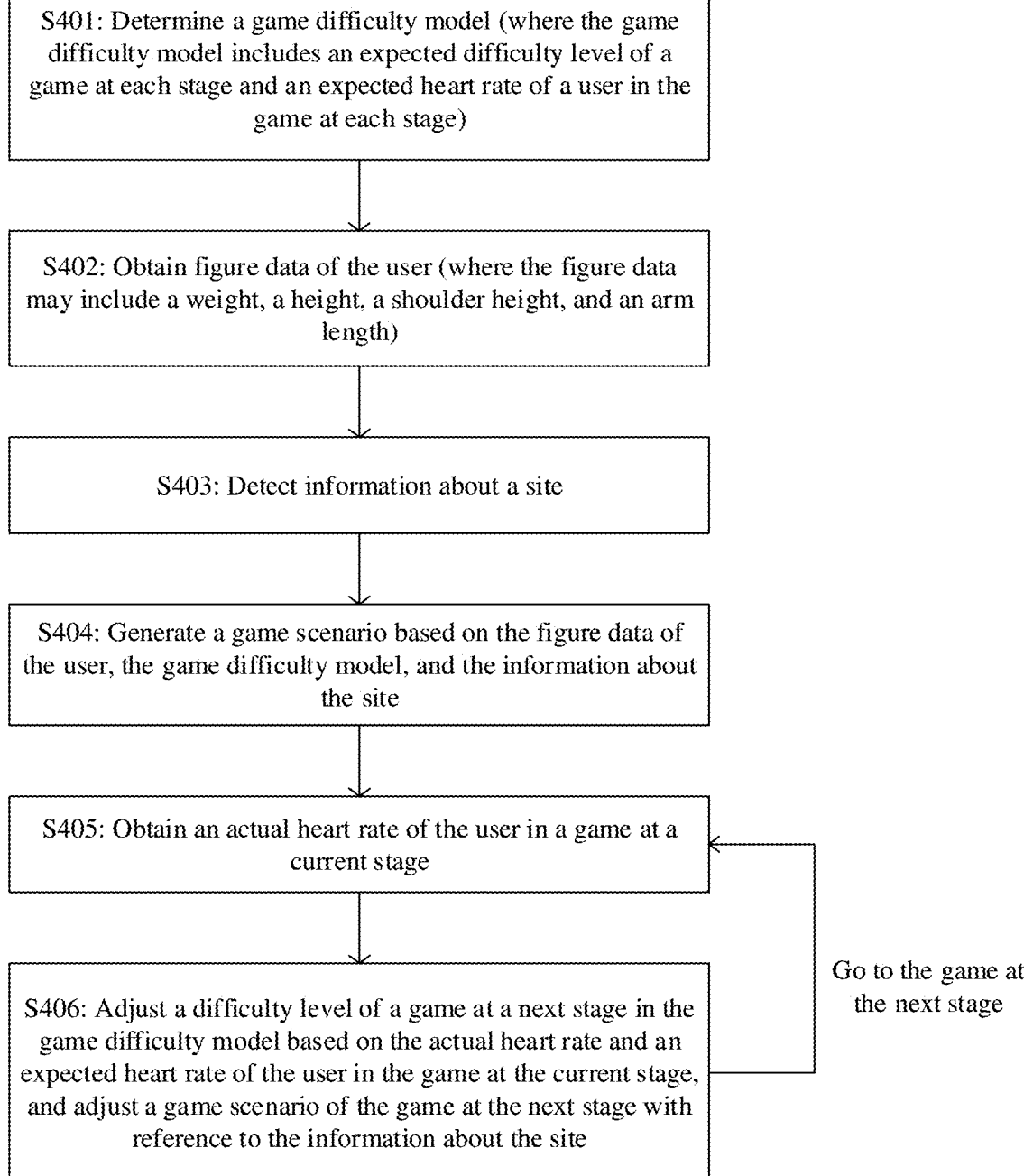
FIG. 7 is a flowchart of another somatosensory interaction method according to an embodiment of this application.

FIG. 7 is an example of a flowchart of another somatosensory interaction method. As shown in FIG. 7, the somatosensory interaction method may include steps S401 to S406.

S401: An electronic device 100 determines a game difficulty model. The game difficulty model may include an expected difficulty level of a game at each stage and an expected heart rate of a user in the game at each stage.

S402: The electronic device 100 obtains figure data of the user. The figure data may include a weight, a height, a shoulder height, and an arm length.

For implementations of step S401 and step S402, refer to step S101 and step S102 in the method shown in FIG. 3 respectively. Details are not described herein again.

S403: The electronic device 100 detects information about a site.

The electronic device 100 may be configured with a camera. The camera may collect an image of the site in which the user plays the game. The electronic device 100 may extract the information about the site based on the image of the site. The information about the site may include coordinates of an unreachable position in the site. A coordinate system in which the coordinates of the unreachable position are located may be a camera coordinate system of the camera. The electronic device 100 may determine the unreachable position in the site by using a target detection algorithm in the field of existing image recognition technologies. An implementation of determining the unreachable position in the site is not limited in this embodiment of this application.

S404: The electronic device 100 generates a game scenario based on the figure data of the user, the game difficulty model, and the information about the site.

On the basis that the game scenario is generated based on the figure data of the user and the game difficulty model in step S103 shown in FIG. 3, the electronic device 100 may further generate the game scenario with reference to the foregoing information about the site. The electronic device 100 may determine a distance between a position of the user and the unreachable position by using the image collected by the camera. Further, when generating the game scenario, the electronic device 100 may prevent a somatosensory motion that the user is indicated to complete in the game scenario from reaching or passing through the foregoing unreachable position.

For example, when a game scenario of a game at a specific stage is determined, a somatosensory motion that the user is indicated to complete in the game scenario generated based on the figure data of the user and the game difficulty model includes any one of jumping leftward 20 centimeters and jumping rightward 20 centimeters. If the electronic device 100 determines, based on the foregoing information about the site, that a position at 10 centimeters on a left side of the user is an unreachable position, and no unreachable position exists within 30 centimeters on a right side of the user, the electronic device 100 may generate a game scenario in which the user is indicated to complete an action of jumping rightward 20 centimeters.

S405: The electronic device 100 obtains an actual heart rate of the user in a game at a current stage.

For an implementation of step S405, refer to step S104 in the method shown in FIG. 3.

S406: The electronic device 100 adjusts a difficulty level of a game at a next stage in the game difficulty model based on the actual heart rate and an expected heart rate of the user in the game at the current stage, and adjusts a game scenario of the game at the next stage with reference to the information about the site.

The electronic device 100 may adjust the difficulty level of the game at the next stage based on the actual heart rate of the user in a game process. After determining the difficulty level of the game at the next stage, the electronic device 100 may adjust, with reference to the foregoing information about the site, the difficulty level of the game at the next stage according to the method for adjusting the exercise load of the somatosensory action that the user is indicated to perform in the game scenario in the foregoing embodiment.

When entering the game at the next stage, the electronic device 100 may use the game at the next stage as a game at a current stage that is playing. Then, the electronic device 100 may continue to adjust a difficulty level and a game scenario of a game at a subsequent stage according to step S405 and step S406.

It should be noted that, the foregoing method for determining the game scenario with reference to the information about the site may alternatively be performed according to the somatosensory interaction method shown in FIG. 5 or FIG. 6. To be specific, the electronic device 100 may adjust the game scenario based on a heart rate percentage or a heart rate response rate with reference to the information about the site, so that a somatosensory action that the user is indicated to complete in an adjusted game scenario does not reach or pass through the unreachable position.

It may be learned from the foregoing somatosensory interaction method shown in FIG. 7 that the electronic device may adjust a game scenario based on figures of users and heart rates in game processes, so that exercise loads of somatosensory actions that the users are indicated to complete in the adjusted game scenario can help different users better achieve exercise effects. In addition, in the foregoing process of adjusting the game scenario, the electronic device may further determine the unreachable position in the site, to avoid a case in which the user is hurt because the user collides with an obstacle in an exercise process.

Figure 8:
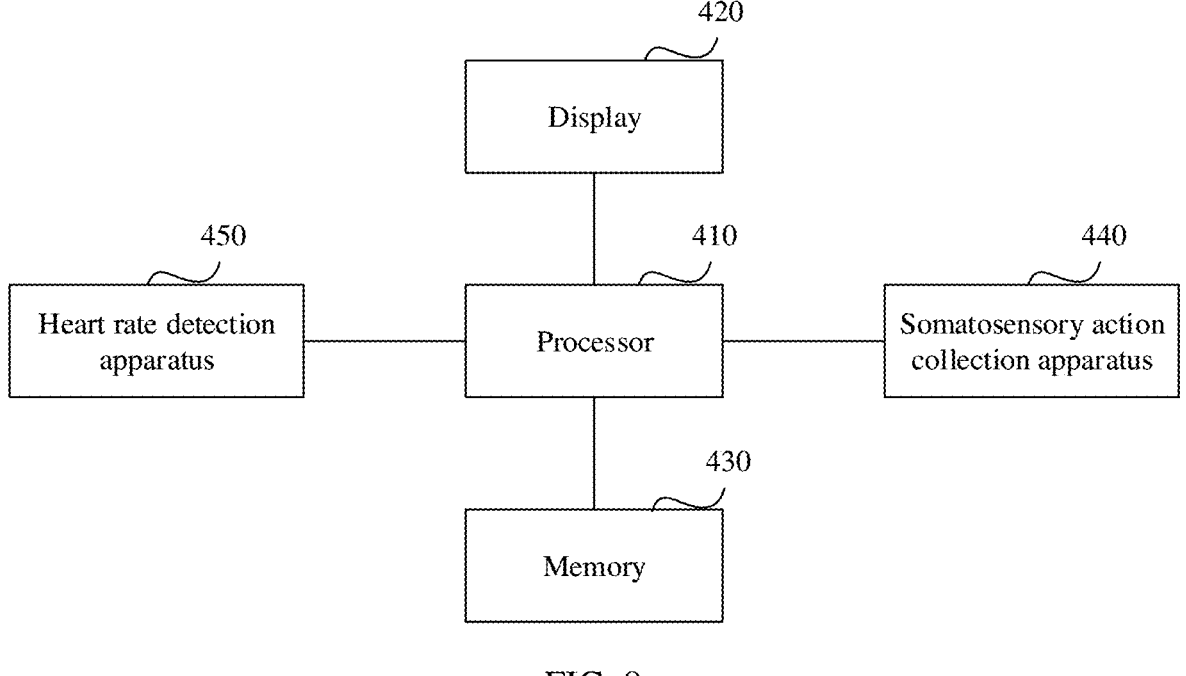
FIG. 8 is a schematic diagram of an apparatus related to a somatosensory interaction method according to an embodiment of this application.

FIG. 8 shows an example of an apparatus related to the foregoing somatosensory interaction method. As shown in FIG. 8, the apparatus related to the foregoing somatosensory interaction method may include a processor 410, a display 420, a memory 430, a somatosensory action collection apparatus 440, and a heart rate detection apparatus 450.

The memory 430 may be configured to store user information and a computer program. The user information includes a user name, an age, a gender, a height, a weight, and the like. The memory 430 may be further configured to store a heart rate response data table of a user.

The processor 410 may be configured to obtain the user information and the computer program from the memory 430. The processor 410 may execute the foregoing computer program, to determine the game difficulty model in the foregoing embodiment, generate a game scenario, and determine whether an action of the user is consistent with an expected action, and whether an action amplitude of the user reaches an expected action amplitude.

The display 420 may be configured to display the game scenario. The display 420 may be integrated with the processor 410 and the memory 430 into one electronic device. The display 420 and the processor 410 may be connected through a bus. That is, the display 420 may be the display 194 in the electronic device 100 shown in FIG. 4. Optionally, the display 420 and the processor 410 may alternatively be separate apparatuses. When the processor 410 generates the game scenario, the processor 410 may send data of the game scenario to the display 420 by using a related communication apparatus. Then, the display 420 may display the game scenario.

The somatosensory action collection apparatus 440 may be configured to detect an actual action and an actual action amplitude of the user. The somatosensory action collection apparatus 440 may send the detected actual action and actual action amplitude of the user to the processor 410 for processing. Further, the processor 410 may determine whether the action of the user is consistent with the expected action and whether the action amplitude of the user reaches the expected action amplitude.

The somatosensory action collection apparatus 440 may be the camera 194 in the foregoing embodiment. Optionally, the somatosensory action collection apparatus 440 may alternatively be an inertial sensor-based handheld apparatus or wearable apparatus. A type of the somatosensory action collection apparatus 440 is not limited in this embodiment of this application.

The heart rate detection apparatus 450 may be configured to detect a heart rate.

In a possible implementation, the heart rate detection apparatus 450, the processor 410, and the memory 430 may be integrated into one electronic device. For example, the electronic device may obtain the heart rate of the user by using a non-contact heart rate detection method. The heart rate detection apparatus 450 may include a camera, a calculation module, and a storage module. The camera may be configured to collect a video image of the user. The calculation module may determine facial information of the user from the foregoing video image, and extract a photoplethysmography signal of the user from the facial information. Then, the calculation module may calculate the heart rate of the user based on the photoplethysmography signal. When the heart rate detection apparatus 450 obtains the heart rate of the user, the heart rate detection apparatus 450 may send the heart rate of the user to the processor 410 for processing. In this way, the processor 410 may adjust a difficulty level of a game based on the heart rate of the user. If the somatosensory action collection apparatus 440 includes a camera, the camera of the heart rate detection apparatus 450 may be the camera in the somatosensory action collection apparatus 440. The calculation module of the heart rate detection apparatus 450 may be the foregoing processor 410 or one module integrated into the processor 410. The storage module of the heart rate detection apparatus 450 may be the foregoing memory 430 or one module integrated into the memory 430.

In a possible implementation, the heart rate detection apparatus 450 and the processor 410 are separate apparatuses. The heart rate detection apparatus 450 may be, for example, a smart band that can be used to detect a heart rate, a heart rate monitor chest strap, or the like. The processor 410 may obtain the heart rate of the user from the heart rate detection apparatus by using a related communication apparatus.

In addition, the heart rate percentage and the heart rate response rate in the foregoing embodiment may be calculated by the heart rate detection apparatus 450, or may be calculated by the processor 410. This is not limited in embodiments of this application.

In this embodiment of this application, the electronic device 100 displays first somatosensory interaction content. The first somatosensory interaction content may be the game at the first stage in the foregoing embodiment. A higher difficulty level of the game at the first stage indicates a higher exercise load of a somatosensory action of the first somatosensory interaction content. Similarly, the electronic device 100 displays second somatosensory interaction content. The second somatosensory interaction content may be the game at the second stage in the foregoing embodiment. The game at the first stage and the game at the second stage are games at two adjacent stages.

The electronic device 100 may determine the exercise load of the somatosensory action of the first somatosensory interaction content based on obtained user data. The user data may include one or more of the following: a height, a weight, a shoulder height, and an arm length. For example, the electronic device 100 may predict physical fitness of the user based on the height and the weight of the user. For users of a same height, the electronic device 100 may predict that a user of a heavier weight has poorer physical fitness. Alternatively, the electronic device 100 may calculate a BMI of the user based on the height and the weight of the user. The electronic device 100 may predict that a user with a higher BMI has poorer physical fitness. The foregoing user data may further include a body fat percentage and an amount of oxygen consumed per unit time. This is not limited in this embodiment of this application.

In this embodiment of this application, the electronic device 100 detects that the user performs a first action of the first somatosensory interaction content. The first action may be any somatosensory action in somatosensory interaction content. The electronic device 100 obtains first heart data generated when the user performs the first action. The first heart data may be a heart rate or a heart rate percentage. If the first heart data is a heart rate, first expected heart data associated with the first somatosensory interaction content is also a heart rate. If the first heart data is a heart rate percentage, first expected heart data associated with the first somatosensory interaction content is also a heart rate percentage. In some embodiments, the first expected heart data may be a specific value or a range of expected heart data reached when the user completes the first somatosensory interaction content.

That the first heart data of the user is the same as the first expected heart data may represent that the exercise load of the somatosensory action of the first somatosensory interaction content is appropriate for the user. That the first heart data of the user is different from the first expected heart data may represent that the exercise load of the somatosensory action of the first somatosensory interaction content is excessively simple or excessively difficult for the user.

In this embodiment of this application, the electronic device 100 may obtain second heart data of the user. The second heart data may be a heart rate or a heart rate percentage. Both the second heart data and the first expected heart data are heart rates or heart rate percentages. The second heart data may be heart data of the user that is generated at any time before the end of the first somatosensory interaction content. Preferably, the second heart data may be heart data of the user that is generated in a first time period after the electronic device starts to display the first somatosensory interaction content. The first time period may be a short time period, for example, 1 second or 2 seconds. A length of the first time period is not limited in this embodiment of this application. Alternatively, the second heart data may be heart data of the user that is generated in a second time period before the electronic device starts to display the first somatosensory interaction content. The second time period may be a short time period, for example, 1 second or 2 seconds. A length of the second time period is not limited in this embodiment of this application.

In this embodiment of this application, the electronic device 100 may calculate a first heart rate response rate based on the second heart data and the foregoing first expected heart data. Specifically, the electronic device 100 may calculate a difference between the second heart data and the first expected heart data, and divide the difference by a time length of a process from a time at which the second heart data is obtained to the end of the first somatosensory interaction content, to obtain the first heart rate response rate.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. A computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method, comprising:
obtaining, by an electronic device, user data;
displaying, by the electronic device, first somatosensory interaction content;
detecting, by the electronic device, that the user is performing a first action of the first somatosensory interaction content;
obtaining, by the electronic device, first heart data generated when the user performs the first action;
comparing, by the electronic device, the first heart data with first expected heart data associated with the first somatosensory interaction content;
displaying, by the electronic device, second somatosensory interaction content when the first heart data is different from the first expected heart data, wherein the second somatosensory interaction content is content displayed by the electronic device at a next stage of the first somatosensory interaction content;
detecting, by the electronic device, information about a site in which the user is located, wherein the information about the site comprises coordinates of a position at which an obstacle exists in the site in which the user is located, and the obstacle is an object whose distance from the user falls within a first preset distance range; and
changing, by the electronic device, the first somatosensory interaction content and the second somatosensory interaction content based on the information about the site, wherein a somatosensory action of changed first somatosensory interaction content and a somatosensory action of changed second somatosensory interaction content are performed in directions of avoiding the obstacle.

2. The method according to claim 1, further comprising:
displaying, by the electronic device, third somatosensory interaction content when the first heart data is the same as the first expected heart data, wherein the third somatosensory interaction content is content displayed by the electronic device at the next stage of the first somatosensory interaction content.

3. The method according to claim 1, wherein that the first heart data is different from the first expected heart data comprises: the first heart data exceeds a range of the first expected heart data.

4. The method according to claim 2, wherein when the first heart data is lower than the first expected heart data, an exercise load of somatosensory action of the second somatosensory interaction content is higher than an exercise load of somatosensory action of the third somatosensory interaction content.

5. The method according to claim 1, wherein the first heart data is obtained by the electronic device from a heart data detection device, and a communication connection is established between the electronic device and the heart data detection device.

6. The method according to claim 1, wherein an exercise load of a somatosensory action of the first somatosensory interaction content comprises one or more of the following: an amplitude of the somatosensory action, a quantity of times of completing the same somatosensory action within a same time length, or a type of the somatosensory action.

7. The method according to claim 6, wherein the amplitude of the somatosensory action is expected overall displacement of a body of the user or a sum of expected displacement of all body parts of the user.

8. The method according to claim 1, further comprising:

when the electronic device determines that the first heart data is greater than or equal to a maximum value of heart data of the user, pausing, by the electronic device, the first somatosensory interaction content, or displaying, by the electronic device, fourth somatosensory interaction content, wherein an exercise load of a somatosensory action of the fourth somatosensory interaction content is lower than an exercise load of a somatosensory action of the first somatosensory interaction content.

9. An electronic device, comprising:

a display;

at least one processor;

a memory;

a heart data detection apparatus; and a somatosensory action collection apparatus, wherein:

the display is configured to display somatosensory interaction content;

the heart data detection apparatus is configured to detect heart data of a user;

the somatosensory action collection apparatus is configured to detect a somatosensory action of the somatosensory interaction content;

the memory is configured to store a computer program that is executable by the at least one processor; and the program includes instructions for:

obtaining user data;

displaying first somatosensory interaction content;

detecting that the user is performing a first action of the first somatosensory interaction content;

obtaining first heart data generated when the user performs the first action;

comparing the first heart data with first expected heart data associated with the first somatosensory interaction content;

displaying second somatosensory interaction content when the first heart data is different from the first expected heart data, wherein the second somatosensory interaction content is content displayed by the electronic device at a next stage of the first somatosensory interaction content;

detecting information about a site in which the user is located, wherein the information about the site comprises coordinates of a position at which an obstacle exists in the site in which the user is located, and the obstacle is an object whose distance from the user falls within a first preset distance range; and changing the first somatosensory interaction content and the second somatosensory interaction content based on the information about the site, wherein a somatosensory action of changed first somatosensory interaction content and a somatosensory action of changed second somatosensory interaction content are performed in directions of avoiding the obstacle.

10. The electronic device according to claim 9, wherein the program further includes instructions for:

displaying third somatosensory interaction content when the first heart data is the same as the first expected heart data, wherein the third somatosensory interaction content is content displayed by the electronic device at a next stage of the first somatosensory interaction content.

11. The electronic device according to claim 9, wherein that the first heart data is different from the first expected heart data comprises: the first heart data exceeds a range of the first expected heart data.

12. The electronic device according to claim 10, wherein when the first heart data is lower than the first expected heart data, an exercise load of a somatosensory action of the second somatosensory interaction content is higher than an exercise load of the somatosensory action of the third somatosensory interaction content.

13. The electronic device according to claim 9, wherein the first heart data is obtained by the electronic device from another heart data detection device, and a communication connection is established between the electronic device and the heart data detection device.

14. The electronic device according to claim 9, wherein an exercise load of a somatosensory action of the first somatosensory interaction content comprises one or more of the following: an amplitude of the somatosensory action of the first somatosensory interaction content, a quantity of times of completing the same somatosensory action of the first somatosensory interaction content within a same time length, or a type of the somatosensory action of the first somatosensory interaction content.

15. The electronic device according to claim 14, wherein the amplitude of the somatosensory action of the first somatosensory interaction content is expected overall displacement of a body of the user or a sum of expected displacement of all body parts of the user.

16. The electronic device according to claim 9, wherein the program further includes instructions for:

pausing, by the electronic device, the first somatosensory interaction content when the electronic device determines that the first heart data is greater than or equal to a maximum value of heart data of the user.

17. A non-transitory computer readable media storing instructions that are executable by at least one processor, wherein the instructions, when executed by the at least one processor, enable an electronic device to:

obtain user data;

display first somatosensory interaction content;

detect that the user is performing a first action of the first somatosensory interaction content;

obtain first heart data generated when the user performs the first action;

compare the first heart data with first expected heart data associated with the first somatosensory interaction content;

display second somatosensory interaction content when the first heart data is different from the first expected heart data, wherein the second somatosensory interaction content is content displayed by the electronic device at a next stage of the first somatosensory interaction content;

detect information about a site in which the user is located, wherein the information about the site comprises coordinates of a position at which an obstacle exists in the site in which the user is located, and the obstacle is an object whose distance from the user falls within a first preset distance range; and change the first somatosensory interaction content and the second somatosensory interaction content based on the information about the site, wherein a somatosensory action of changed first somatosensory interaction content and a somatosensory action of changed second somatosensory interaction content are performed in directions of avoiding the obstacle.

18. The non-transitory computer readable media according to claim 17, wherein the instructions, when executed by the at least one processor, further enable the electronic device to:

display third somatosensory interaction content when the first heart data is the same as the first expected heart data, wherein the third somatosensory interaction content is content displayed by the electronic device at a next stage of the first somatosensory interaction content.

\* \* \* \* \*